US011663713B2

(12) United States Patent
Ohmori et al.

(10) Patent No.: US 11,663,713 B2
(45) Date of Patent: May 30, 2023

(54) IMAGE GENERATION SYSTEM

(71) Applicant: Hitachi, Ltd., Tokyo (JP)

(72) Inventors: Takeshi Ohmori, Tokyo (JP); Yutaka Okuyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 17/155,680

(22) Filed: Jan. 22, 2021

(65) Prior Publication Data
US 2021/0241436 A1 Aug. 5, 2021

(30) Foreign Application Priority Data
Feb. 5, 2020 (JP) .............................. JP2020-017613

(51) Int. Cl.
*G06T 7/00* (2017.01)
*G06F 16/51* (2019.01)
*G06T 7/60* (2017.01)
*G06T 11/00* (2006.01)

(52) U.S. Cl.
CPC .............. *G06T 7/001* (2013.01); *G06F 16/51* (2019.01); *G06T 7/60* (2013.01); *G06T 11/00* (2013.01); *G06T 2207/20081* (2013.01); *G06T 2207/30148* (2013.01)

(58) Field of Classification Search
CPC . G06T 7/001; G06T 7/60; G06T 11/00; G06T 2207/20081; G06T 2207/30148; G06T 3/00; G06F 16/51; G01B 2210/56; G01B 11/02; G01B 15/04; G06N 3/045; G06N 3/047; G06N 20/10; G06N 3/08; G01N 23/2251
See application file for complete search history.

(56) References Cited

U.S. PATENT DOCUMENTS

| 2002/0181776 A1 | 12/2002 | Ikku |
| 2018/0082873 A1 | 3/2018 | Ohmori et al. |
| 2019/0228522 A1 | 7/2019 | Shinoda et al. |

(Continued)

FOREIGN PATENT DOCUMENTS

| JP | 2002-350127 A | 12/2002 |
| JP | 2012-68138 A | 4/2012 |

(Continued)

OTHER PUBLICATIONS

Korean-language Office Action issued in Korean Application No. 10-2020-0146522 dated Aug. 16, 2022 with English translation (eight (8) pages).

*Primary Examiner* — Christopher Wait
(74) *Attorney, Agent, or Firm* — Crowell & Moring LLP

(57) ABSTRACT

Provided is a system that constructs a learning database for a learning model in a short period of time. The system generates an image in which a structure image is similar to an actual image by image processing of the structure image. One or more processors acquire a first structure image and a second structure image different from the first structure image. The one or more processors create a plurality of intermediate structure images indicating an intermediate structure between the first structure image and the second structure image. The one or more processors generate an image by making each of the plurality of intermediate structure images to be similar to an actual image by image processing of each of the plurality of intermediate structure images.

17 Claims, 37 Drawing Sheets

(56) References Cited

U.S. PATENT DOCUMENTS

2020/0218980 A1\* 7/2020 Matsumoto ............ A61B 1/045
2020/0328101 A1 10/2020 Ohmori et al.

FOREIGN PATENT DOCUMENTS

| JP | 2018-49936 A | 3/2018 |
| JP | 2019-129169 A | 8/2019 |
| WO | WO 2019/069629 A1 | 4/2019 |

\* cited by examiner

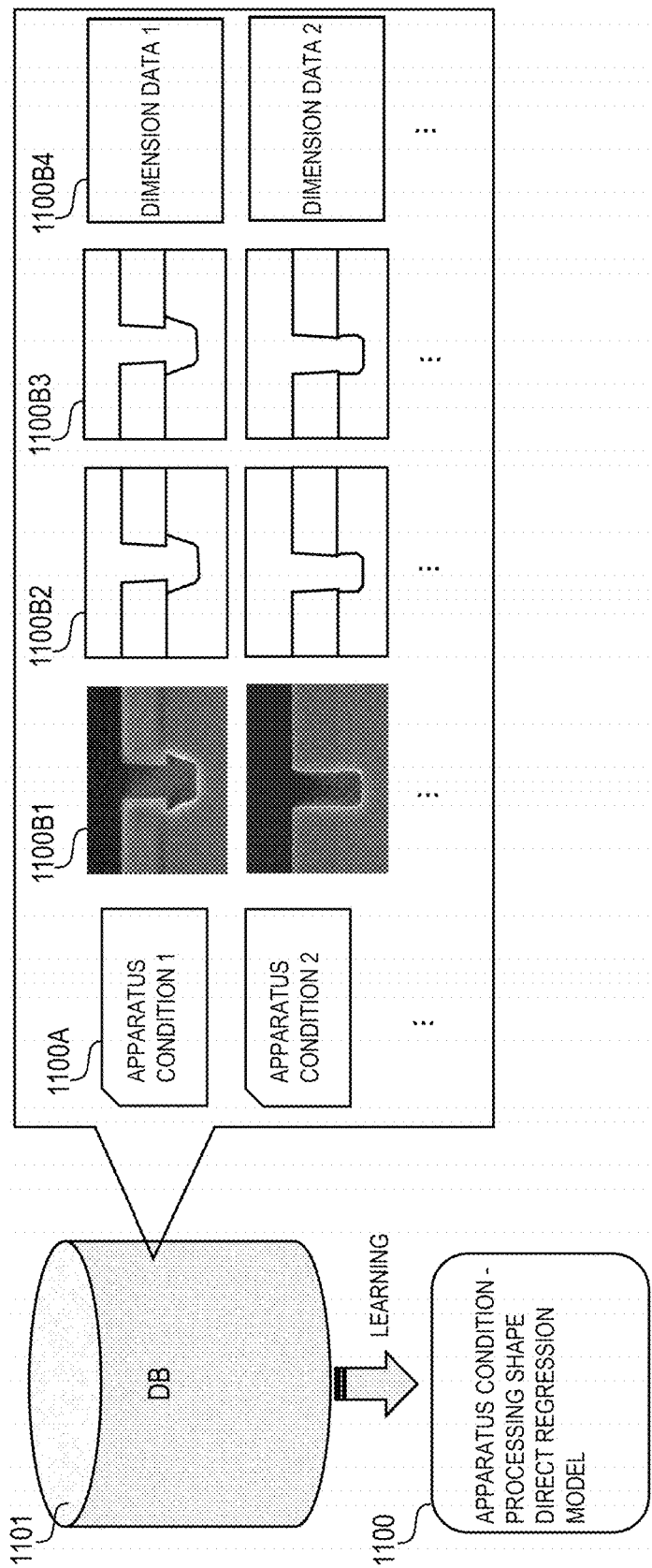

FIG. 20

```xml
<annotation>
    <folder>training</folder>
    <filename>sample001.jpg</filename>
    <size>
        <width>1280</width>
        <height>960</height>
    </size>
    <object>
        <name>pattern</name>
        <bndbox>
            <xmin>126</xmin>
            <ymin>433</ymin>
            <xmax>326</xmax>
            <ymax>667</ymax>
        </bndbox>
    </object>
    ...
</annotation>
```

| LABEL NAME | LABEL NUMBER | COLOR |
|---|---|---|
| BACKGROUND | 0 | BLACK |
| MASK | 1 | GRAY |
| SUBSTRATE | 2 | WHITE |

|  | xmin | ymin | xmax | ymax |
|---|---|---|---|---|
| BOUNDING BOX 0 | 25.7 | 411.8 | 316.5 | 763.4 |
| BOUNDING BOX 1 | 316.6 | 426.6 | 615.8 | 750.3 |
| BOUNDING BOX 2 | 628.6 | 416.9 | 918.1 | 748.1 |
| BOUNDING BOX 3 | 927.7 | 427.4 | 1243.5 | 761.5 |

|  | L1 [nm] | L2 [nm] | L3 [nm] | L4 [nm] | L5 [nm] |
|---|---|---|---|---|---|
| PATTERN 0 | 100.2 | 148.8 | 83.3 | 77.4 | 234.1 |
| PATTERN 1 | 108.1 | 151.8 | 82.3 | 76.4 | 234.1 |
| PATTERN 2 | 98.2 | 150.8 | 61.5 | 78.4 | 229.2 |
| PATTERN 2 | 105.2 | 150.8 | 69.4 | 78.4 | 229.2 |
| AVERAGE | 102.9 | 150.6 | 74.1 | 77.7 | 231.6 |
| STANDARD DEVIATION | 4.5 | 1.3 | 10.5 | 1.0 | 2.8 |

| LABEL NAME | LABEL NUMBER | COLOR |
|---|---|---|
| BACKGROUND | 0 | WHITE |
| CONTOUR | 1 | BLACK |

| LABEL NAME | LABEL NUMBER | COLOR |
|---|---|---|
| BACKGROUND | 0 | WHITE |
| A | 1 | RED |
| C | 2 | GREEN |
| E | 3 | BLUE |
| G | 4 | BLACK |

IMAGE GENERATION SYSTEM

CLAIM OF PRIORITY

The present application claims priority from Japanese patent application JP 2020-17613 filed on Feb. 5, 2020, the content of which is hereby incorporated by reference into this application.

BACKGROUND OF THE INVENTION

1. Field of the Invention

The present invention relates to image generation, and more particularly to the generation of an image in which a structure image is similar to an actual image.

2. Description of the Related Art

In recent years, in order to improve performance of a semiconductor device, a new material is introduced into the semiconductor device, and at the same time, a structure of the semiconductor device is solidified and complicated. In addition, processing of an advanced semiconductor device requires nanometer-level accuracy. Therefore, a semiconductor processing apparatus needs to be able to process various types of materials into various shapes with high accuracy, and is inevitably an apparatus having a large number of control parameters (input parameters).

On the other hand, in order to sufficiently draw out the performance of the semiconductor processing apparatus, it is necessary to determine input parameters ranging from several to several ten types for each semiconductor processing apparatus. There are also a number of steps in one process, and the input parameters need to be changed for each step. Therefore, it is fairly difficult to determine a combination of input parameters that can obtain a goal processing result. For this reason, development cost is increased due to long term development of processing conditions. Further, the number of steps with high difficulty is increasing, and there is a lack of top engineers having advanced knowledge and skills to deal with the increasing steps with high difficulty.

Further, in order to evaluate a processing result, a cross-sectional image of a sample after processing is acquired, and a critical dimension is acquired. However, measurement is difficult due to miniaturization and structure complexity of a semiconductor device structure. Measurement position determination with a precision of a nanometer level is required, and further, the number of measurement points is increased to evaluate statistical dispersion of measurement dimensions, and time required for measurement is increased.

As described above, the semiconductor processing apparatus is required for a function of automatically drawing out the performance of the semiconductor processing apparatus by itself and a function of supporting an engineer who draws out the performance of the semiconductor processing apparatus.

To solve the above problem, JP-A-2018-49936 (Patent Literature 1) proposes a method of automatically searching for an optimal processing condition. Accordingly, the number of steps can be reduced in each stage as compared with a method in the related art that relies on trials and errors of engineers.

JP-A-2012-68138 (Patent Literature 2) and JP-A-2002-350127 (Patent Literature 3) are related-art literatures disclosing dimension measurement based on a cross-sectional image of a pattern. In Patent Literature 2, a contour line is obtained from a luminance value of an image, coordinate values of two points in an upper part and a lower part of a pattern cross section are used, and a signal component of a white shadow portion peculiar to a cross-sectional Scanning Electron Microscope (SEM) image is manually removed, thereby improving measurement accuracy of a side wall angle. In Patent Literature 3, an edge point is obtained from a change in a luminance value of a cross-sectional SEM image, and a straight line that approximates each side of a pattern is determined, thereby reducing dependence on an operator in measuring an angle and a length of each side.

A scanning electron microscope (SEM) is usually used for observing a cross-sectional image of a fine structure. In order to perform dimension extraction from the SEM image with high accuracy and high speed, it is only necessary to perform semi-automation or automation thereof. As a method for implementing this, it is conceivable to apply image recognition technology using machine learning, particularly deep learning. There are two problems at this time including (1) learning database construction, and (2) learning model and learning method construction thereof.

(1) Learning Database Construction

In learning of a dimension extraction model, it is necessary to learn a relationship between the SEM image and a dimension extraction position. Therefore, as learning data, the SEM image and data for designating the dimension extraction position are necessary. Examples of the data designating the dimension extraction position include a structure contour line in the SEM image, area specification for each structure, and measurement position coordinates.

However, since the current dimension measurement processing from the SEM image is generally performed manually, preparation of the learning data is inevitably performed manually, and work time equal to or longer than the dimension measurement is required. With only basic dimension extraction, the number of measurement points per image required for evaluation of the processing result is increased with complication of a cross-sectional structure of an advanced device, and the dimension extraction performed manually is reaching a limit. Therefore, there is a need for a method and a system capable of constructing a learning database in a short period of time.

(2) Learning Model and Learning Method Construction Thereof

In the dimension extraction from the SEM image by the dimension extraction model learned from the above learning database, it is necessary to implement image recognition performance equal to or better than visual observation. As an image recognition method for this purpose, it is conceivable to apply image recognition technology using machine learning, particularly deep learning.

Although the methods disclosed in Patent Literatures 2 and 3 can reduce operator dependence to some extent, measurement variation due to operator dependence occurs since the methods involve operation by visual observation. In addition, since measurement is performed while viewing images one by one, work time is required. Further, even in an image in which a unit pattern of line/space is repeated, since measurement is performed for each individual pattern, a human error may be added to a statistical value of the measurement value in addition to processing variation.

Further, in the course of proceeding with condition derivation, when measurement locations more important than originally planned positions are found, re-measurement of the entire image is necessary. This requires a huge amount of measurement time, and in reality, the re-measurement may not be possible.

Further, cross-sectional SEM images have difficulties in dimension measurement that are not found in critical dimensional SEM images in which brightness differs for each image, a deep structure unnecessary for dimension measurement is shown, and a boundary of an interface between different types of materials whose dimensions are to be measured is unclear. Therefore, in the methods of Patent Literatures 2 and 3 based on an edge detection method using a luminance value, it is necessary to perform operation such as parameter tuning of a threshold or the like for each image, or to visually determine and specify an interface position. In order to implement the automatic measurement requiring no adjustment by visual observation, it is necessary to extract a contour of an object by recognizing a region of each object in the image instead of local luminance distribution.

SUMMARY OF THE INVENTION

One aspect of the invention is to construct a learning database required for constructing a learning model in a short period of time.

One aspect of the invention is to provide a system that generates an image in which a structure image is similar to an actual image by image processing of the structure image. The system includes one or more storage apparatuses; and one or more processors that operate in accordance with a program stored in the one or more storage apparatuses. The one or more processors acquire a first structure image and a second structure image different from the first structure image. The one or more processors create a plurality of intermediate structure images indicating an intermediate structure between the first structure image and the second structure image. The one or more processors generate an image by making each of the plurality of intermediate structure images to be similar to an actual image by image processing of each of the plurality of intermediate structure images.

According to representative embodiments of the invention, it is possible to construct a learning database of a learning model in a short period of time. Problems, configurations, and effects other than those described above will become apparent from the following description of embodiments.

BRIEF DESCRIPTION OF THE DRAWINGS

FIG. 8A shows a third embodiment of the invention, and is a schematic diagram of an apparatus processing condition derivation method using various databases.

FIG. 9 shows a fourth embodiment of the invention, and is a diagram showing an example of a structure image, a reference image, and a generation image of a metal material or the like.

FIG. 20 shows the fifth embodiment of the invention, and is a description example of annotation data used for learning of the object detection model.

DESCRIPTION OF THE PREFERRED EMBODIMENTS

Embodiments of the invention will be described below with reference to the accompanying figures. Hereinafter, a technology for generating learning data for a learning model for acquiring a feature amount or a feature dimension from a processing result observation image will be described. A semiconductor manufacturing system having a function or a system for searching for processing conditions of an apparatus by learning the acquired feature amount or feature dimension will be described.

In the following description, a method of constructing a learning database in a short period of time, which is necessary for constructing a dimension extraction model from a scanning electron microscope (SEM) image, using an image recognition technology by machine learning, particularly by deep learning, and a measurement method that shortens dimension measurement time and does not include an error caused by an operator by automatically measuring a predetermined dimension from the SEM image using a dimension extraction model will be described.

First Embodiment

Figure 1:
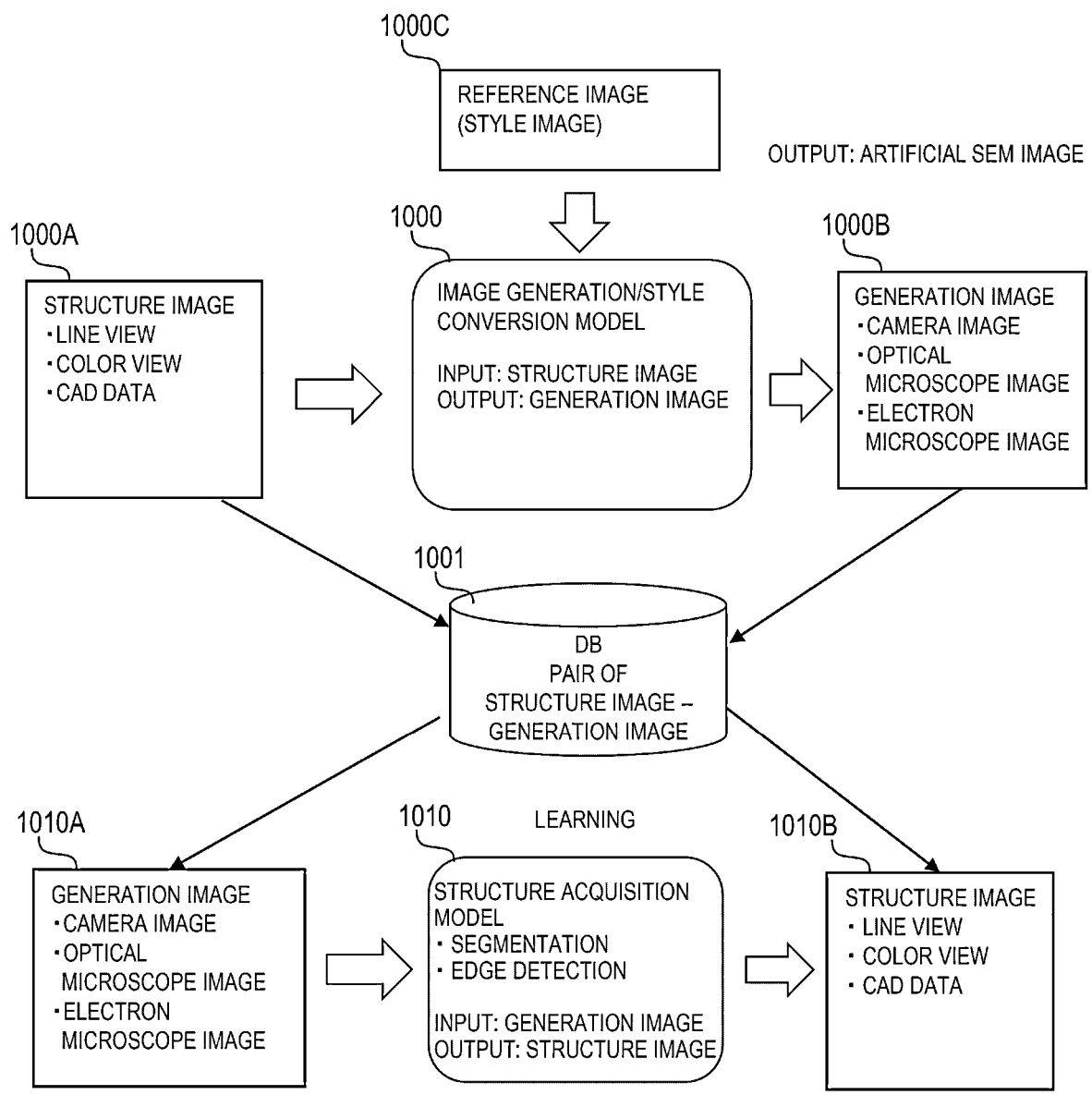
FIG. 1 shows a first embodiment of the invention, and is a schematic diagram of a database construction method of a structure image and a generation image, and learning of a structure acquisition model for obtaining structure information from the generation image.

FIG. 1 shows an outline of a database construction method of a structure image and a generation image, and learning of a structure acquisition model for obtaining structure information from the generation image.

(Database Construction of Structure Image and Generation Image)

A structure image 1000A is, for example, an image showing a cross-sectional structure of an observation image of a cross section of a sample processed by an apparatus. Specifically, the structure image 1000A indicates a contour line of each structure in a cross-sectional image and each structure area. These can be shown, for example, in a line view or a color view (see 1000A1 and 1000A2 in FIG. 2). General drawing software such as drawing software and painting software can be used to create the structure image. The structure image 1000A can also be created using CAD software.

An image generation model (or style conversion model) 1000 generates a generation image 1000B by referring to a reference image (or style image) 1000C based on the structure image 1000A. The generation image 1000B is an image similar to an actual observation image (actual image) and is generated by extracting style information of the reference image 1000C and reflecting a style in the structure image 1000A.

Specific examples of the generation image 1000B include a camera image, an optical microscope image, and an electron microscope image. As the reference image 1000C, for example, a typical example of a target observation image is used.

The image generation model 1000 is constituted by, for example, a neural network, and can use a model in which a data set for image recognition model learning is learned in advance. Alternatively, when there is a data set of a structure image and an actual image (actual image corresponding to the generation image 1000B) similar to a target generation image, an image generation model can be constructed using the data set. In this case, since the image generation model can generate an image without a reference image, the generation image may be generated from the structure image without the reference image.

By creating a plurality of structure images 1000A and inputting the structure images to the image generation model 1000, a plurality of generation images 1000B can be acquired. The structure image 1000A and the generation image 1000B are stored in a database 1001. When the plurality of structure images 1000A are created, numerical data, vector data, or the like defining the structure can be automatically created while changing at a random or constant width or at a constant rate. Alternatively, a specific structure image may be manually created.

When quality of the generation image 1000B by the image generation model 1000 is insufficient, luminance or contrast may be corrected by performing image filtering processing on the generation image 1000B.

As a method different from the present embodiment, which obtains a data set of the structure image and the generation image, in order to obtain the structure image directly from the actual image corresponding to the generation image 1000B, a method of using a learned model learned in a general-purpose image data set can be considered. However, in order to obtain highly accurate contour information and area information required for measurement of feature dimensions in the image, accuracy of such a learned model is usually insufficient. This is because a contour portion is a fairly small ratio to the total number of pixels of the image, and it is difficult to draw the contour information on an output image with high accuracy even with deep learning by the neural network.

As another method different from the embodiment of the present application, contour extraction processing for the actual image is conceivable. However, as described above with reference to JP-A-2012-68138 and JP-A-2002-350127, parameter tuning of a threshold or the like is required, or an interface position needs to be specified by visual observation determination, and it takes a long time to prepare the data set.

Accordingly, the embodiment of the present application uses a method in which a structure image (structure information) is input, a corresponding generation image is generated, and a structure acquisition model is constructed by learning a data set of a pair of the structure image and the generation image.

<Learning of Structure Acquisition Model for Obtaining Structure Information from Generation Image>

A structure acquisition model for obtaining the structure image from the generation image can be constructed by using the database 1001 of a pair of the structure image and the generation image for the learning of a structure acquisition model 1010. Learning at this time uses a generation image 1010A used as input side data of the structure acquisition model 1010, and a structure image 1010B used as output side data. The generation image 1010A is generated as the generation image 1000B, and the structure image 1010B is an image created as the structure image 1000A.

As one method different from the embodiment of the present application, the structure acquisition model 1010 can be learned by creating an actual image similar to the generation image 1010A and annotation data showing a structure thereof. However, as described above, in order to acquire the actual image, processing with an actual apparatus and SEM observation of a cross-sectional image are required, and in addition, annotation data showing the structure is also required, and it takes a long time to prepare the learning data.

Specifically, when a data set is acquired in fine processing for a semiconductor device, an acquisition speed is about 5 to 10 sets per day for processing with the apparatus, SEM observation, and annotation data creation set. For example, if 5 sets are acquired a day or the number of data sets required to sufficiently improve the accuracy of the structure acquisition model is 100 sets, it takes 20 days to prepare the learning data.

In a method according to the embodiment of the present application, it is possible to use the learned image generation model and automatically create the structure image since the learning data set of the structure acquisition model 1010 is created. For this reason, the image generation of the learning data set is completed within minutes at the longest and within 1 second at the shortest. An only remaining required procedure is learning time of the structure acquisition model 1010, which can be as short as a few minutes, usually a few hours to a day. Compared with a case of using an actual image, the method according to the embodiment of the present application can speed up the processing by 20 to 500 times or more (when the learning time of the structure acquisition model is less than 1 hour).

Figure 2:
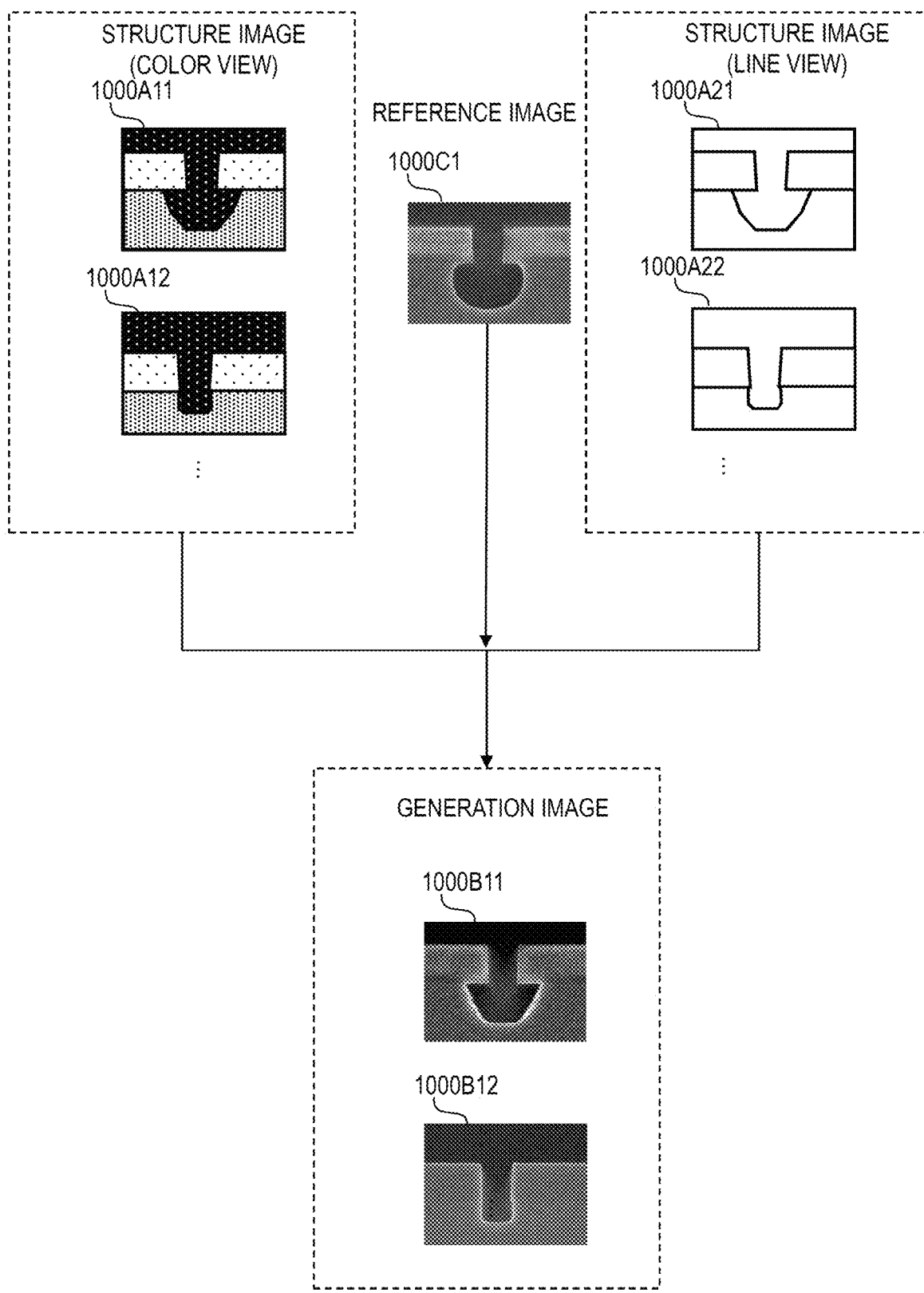
FIG. 2 shows the first embodiment of the invention, and is a diagram showing an example of the structure image, a reference image, and the generation image.

FIG. 2 shows a specific example of the structure image, the reference image, and the generation image. Generation images 1000B11 and 1000B12 are SEM observation images of a sample cross section subjected to fine processing. A reference image 1000C1 is an example of a reference image of the SEM observation image of the sample cross section subjected to the fine processing. Structure images 1000A21 and 1000A22 are line views showing a structure by contour lines in the cross-sectional image. Structure images 1000A11 and 1000A12 schematically show color views in which the structure area in the cross-sectional image is colored. In the present specification, colors of different structure areas of the color views are shown in patterns of different monochromes.

The structure image 1000A11 or 1000A21 is input to the image generation model 1000, and the image generation model 1000 generates the generation image 1000B11, which is an image that has the style of the reference image 1000C. In addition, the structure image 1000A12 or 1000A22 is input to the image generation model 1000, and the image generation model 1000 generates the generation image 1000B12, which is an image that has the style of the reference image 1000C.

Figure 3A:
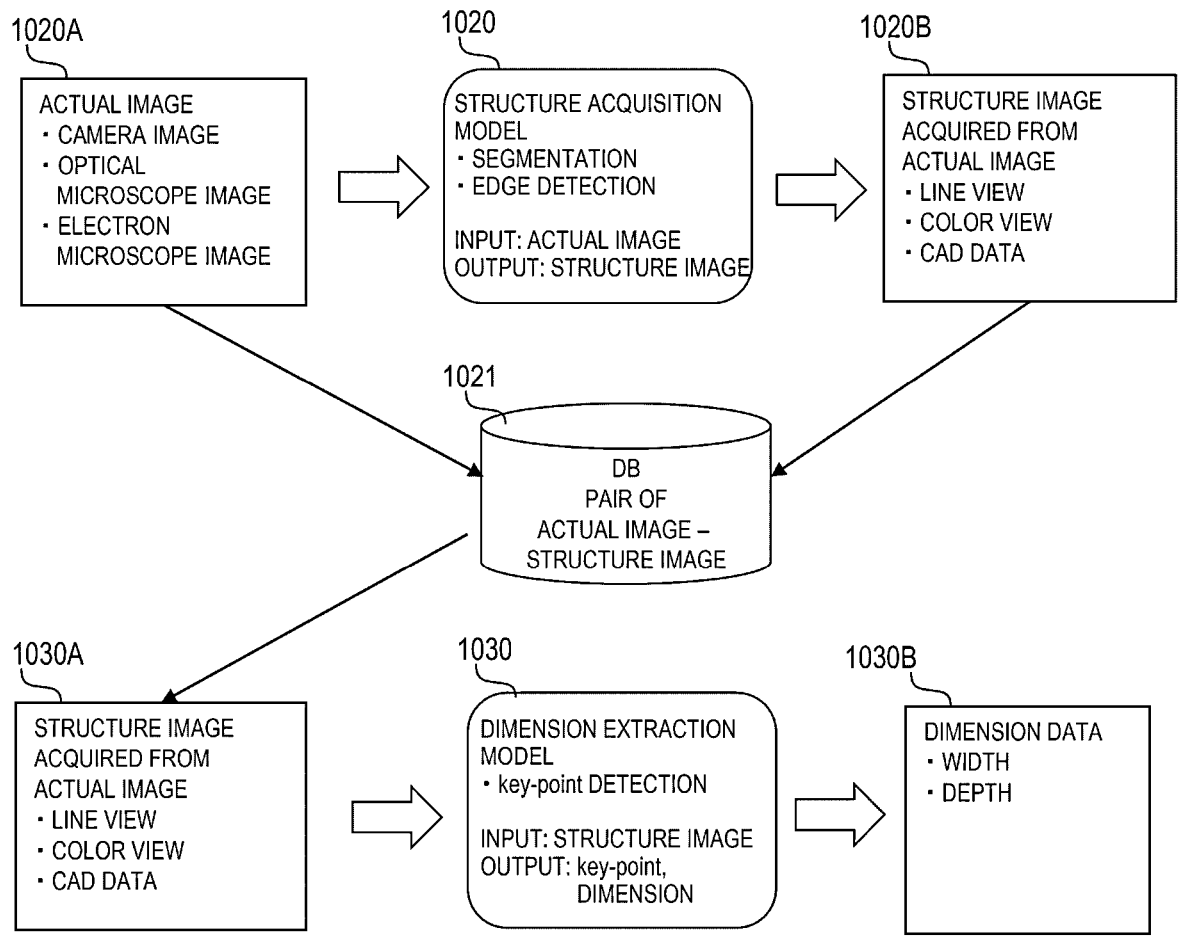
FIG. 3A shows the first embodiment of the invention, and is a schematic diagram of structure image acquisition from an actual image by the structure acquisition model, database construction, and dimension acquisition from a structure image by a dimension extraction model.

FIG. 3A shows an outline of a method of generating a structure image based on an actual image and acquiring dimension data from the structure image. In FIG. 3A, an actual image 1020A is an observation image of a cross section of the sample processed by the apparatus. The method acquires a structure image 1020B based on the actual image 1020A. The actual image 1020A and the structure image 1020B acquired from the actual image are stored in a database 1021. Further, the method acquires dimension data 1030B from a structure image 1030A acquired by the actual image.

The structure acquisition model 1020 is the structure acquisition model 1010 after learning. By inputting the actual image 1020A to the structure acquisition model 1020, the structure image 1020B is obtained as output. The database 1021 is constructed by a data set of the actual image 1020A and the structure image 1020B thereof.

Further, the structure image 1020B stored in the database 1021 is input to the dimension extraction model 1030 as the structure image 1030A. The dimension extraction model 1030 extracts the target dimension data 1030B as a feature amount or a feature dimension in the structure image 1030A. The dimension extraction model 1030 is a learned model for extracting the dimension data 1030B from the input structure image 1030A. A learning method of the dimension extraction model will be described later in fifth and sixth embodiments.

Figure 3B:
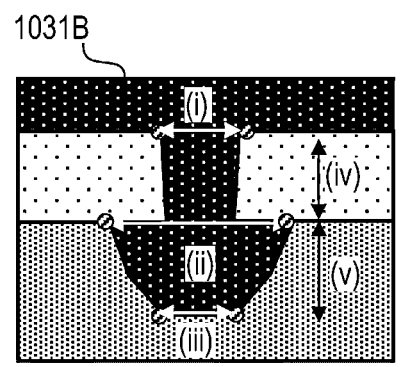
FIG. 3B shows the first embodiment of the invention, and shows a schematic diagram of an example of a dimension extraction position.

FIG. 3B shows a schematic view 1031B of an example of a dimension extraction position. The dimension extraction model 1030 can automatically measure, for example, width dimensions of (i), (ii) and (iii), and depth dimensions of (iv) and (v).

By following the procedures shown in FIGS. 1 and 3A, it is possible to construct a learning database necessary for extracting a dimension from an actual image automatically in a short period of time, and to extract a dimension thereof.

Second Embodiment

As a second embodiment, a method of creating a plurality of structure images in a short period of time when constructing the database of the structure image and the generation image described with reference to FIG. 1 will be described.

Figure 4:
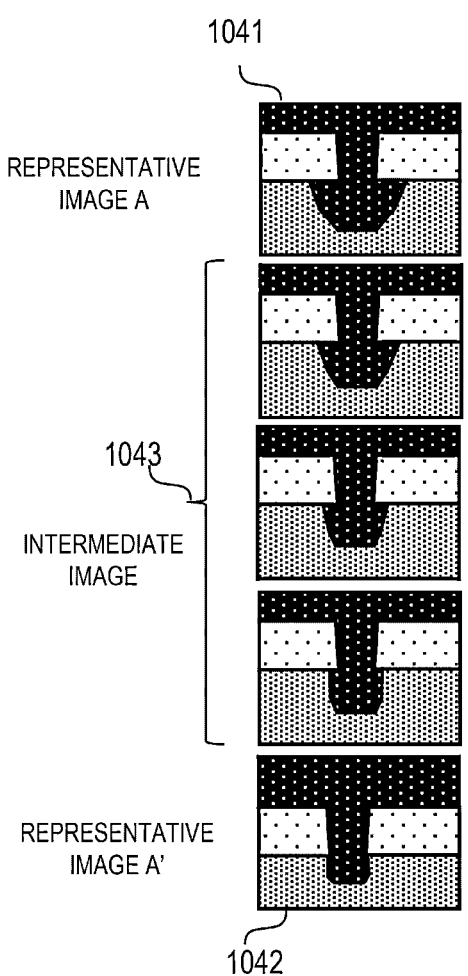
FIG. 4 shows a second embodiment of the invention, and is a diagram showing a preparation method of structure image data.

FIG. 4 shows a method of creating a plurality of structure images serving as intermediate images from two representative structure images. First, two representative images A1041 and A'1042 are created. According to a specified correspondence, a plurality of images when the representative image A1041 is changed from the representative image A1041 to the representative image A' 1042 are created as intermediate images 1043. Such a method of image processing is called morphing.

Specifically, the user can designate a change from one structure (representative image A1041) to another structure (representative image A'1042) by specifying angles, line segments, and arcs that constitute a structure that is the correspondence of the two structure images. As a method of specifying the structure that is the correspondence, a specific position of a line segment and an arc, both ends thereof, and the like can be specified.

Figure 5:
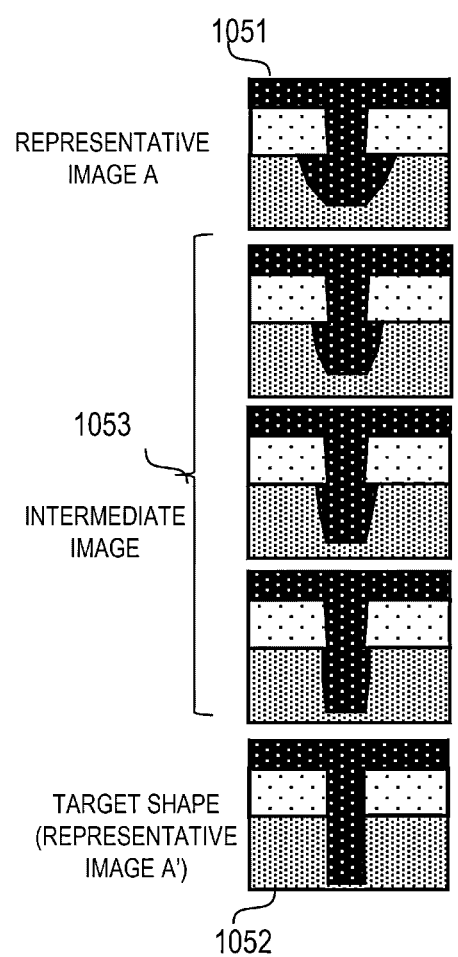
FIG. 5 shows the second embodiment of the invention, and is a diagram showing a preparation method of the structure image data.

FIG. 5 shows a case where a representative structure A' 1052 is a desired goal shape of the sample in the processing in the apparatus. In a typical example of a process of searching for an apparatus processing condition to implement the goal shape as the shape of the sample processed by the apparatus, a shape away from the goal shape is acquired at first, but as the searching proceeds well, a shape close to the goal shape is gradually obtained.

Therefore, if a structure image 1053, which is an intermediate image between a representative image A1051 and an image of a goal shape 1052, is prepared in advance by morphing, a corresponding generation image can be generated. In addition, the structure acquisition model 1020 obtained by learning the generation image and the structure image can be constructed. Therefore, it is possible to construct the structure acquisition model 1020 that can extract structures with high accuracy for actual images that are likely to be acquired during the searching for the goal shape.

Figure 6:
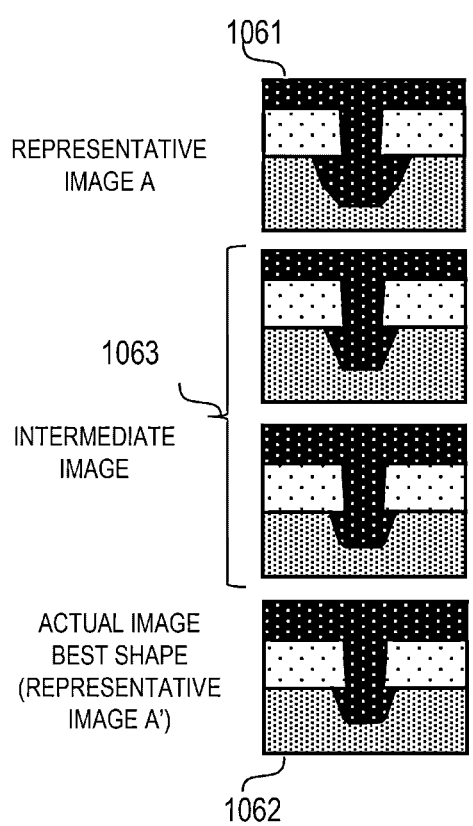
FIG. 6 shows the second embodiment of the invention, and is a diagram showing a preparation method of the structure image data.

FIG. 6 shows an example in which a structure image of an actual image closest to the goal shape is set as the representative image A' among the acquired actual images. An image 1062 shows an example of the structure image of the actual image closest to the goal shape. A structure image 1063, which is an intermediate image from a representative image A1061 to the structure image 1062, can be prepared in advance by morphing.

Therefore, it is possible to construct the structure acquisition model 1020 that can extract structures with high accuracy for actual images that are likely to be acquired during the searching for the goal shape. Although it is possible to manually create a structure image for an actual image that is closest to the goal shape, as shown with reference to FIG. 3A, it is possible to shorten time required to create the structure image by automatically acquiring a structure image from an actual image using the structure acquisition model 1020 which is learned so far.

Closeness, that is, difference (or similarity) between the goal shape and the actual image can be evaluated by using a sum of errors of each feature amount or each feature dimension of the goal shape and the actual image. The error can be calculated using a difference, an absolute value, a square error, or the like of each parameter. The smaller the error is, the closer the actual image is to the goal shape.

Figure 7:
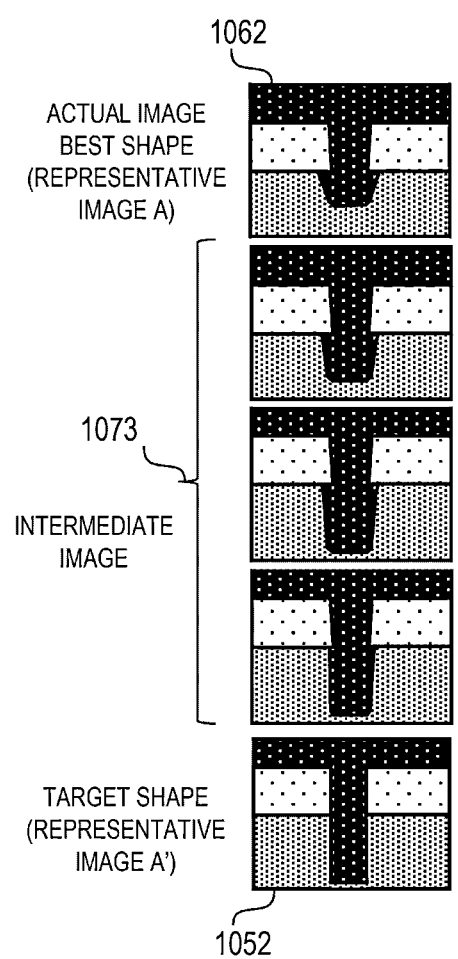
FIG. 7 shows the second embodiment of the invention, and is a diagram showing a preparation method of the structure image data.

FIG. 7 shows an example of a representative image for implementing correspondence to an actual image that is likely to be acquired and high accuracy of structure extraction. Specifically, the structure image 1062 created from the actual image closest to the goal shape among the acquired actual images is set as the representative image A, and the structure image 1052 of the goal shape is set as the representative image A'.

When searching for the apparatus processing condition for implementing the goal shape and the searching is successful, it is fairly likely that a shape intermediate between the acquired best shape and the goal shape is acquired. Therefore, by preparing an intermediate image 1073 corresponding to the shapes in advance, it is possible to correspond to the actual image that is more likely to be acquired and to achieve the high accuracy of the structure extraction.

The representative image A and the representative image A' described in FIGS. 4 to 7 can be set by exchanging the two in order to determine the structures that are both ends when creating the image of the intermediate structure. As described above, the image of the intermediate structure is generated from the two structure images, and a generation image similar to the structure image and the actual image is constructed as a database. By using the generation image similar to the actual image, it is possible to learn the relationship between the structure image and the actual image without acquiring the actual image. In addition, when searching for a goal processing shape by setting one of two different structure images as the structure image corresponding to the shape closest to the goal shape among the acquired actual images and setting the other as the goal shape, accuracy of structure acquisition from the actual image is improved by including the image that is likely to be actually acquired in the learning data in advance.

Third Embodiment

Figure 8B:
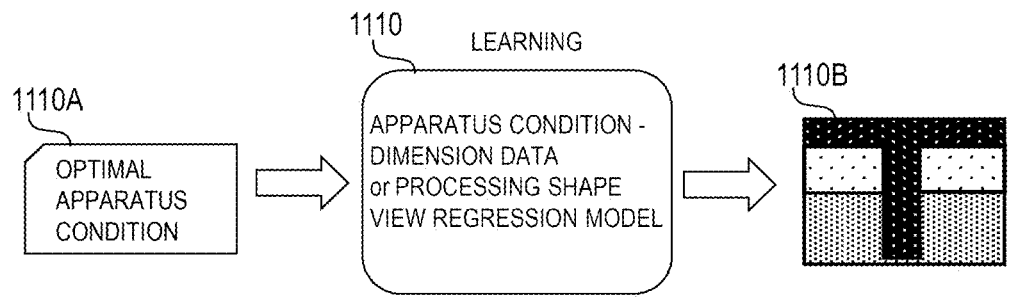
FIG. 8B shows the third embodiment of the invention, and is a schematic diagram of an apparatus processing condition derivation method using various databases.

As a third embodiment, a method of optimizing an apparatus processing condition for obtaining a goal shape using a learning model and a database constructed by the method described with reference to FIGS. 1 and 3 will be described. An outline thereof is shown in FIGS. 8A and 8B. A database 1101 includes an apparatus condition 1100A and an actual image 1100B1 which is a cross-sectional image of a sample processed using the apparatus condition, which are gradually accumulated during the searching for the goal shape. The database 1101 includes a structure image acquired from the actual image 1100B1. Structure images 1100B2 and 1100B3 are examples of the structure image.

Further, the database 1101 includes dimension data 1100B4 extracted from the structure image.

As described above, in order to acquire the structure images 1100B2 and 1100B3 from the actual image 1100B1, the structure acquisition model 1020 can be used. The dimension data 1100B4 may use a value measured manually from the actual image 1100B1, and the dimension data 1100B4 acquired from the structure images 1100B2 and 1100B3 using the dimension extraction model 1030 can also be used.

By constructing a learning model 1110 that discloses a relationship between the apparatus condition 1100A and other data 1100B1 to 1100B4, it is possible to search for the apparatus condition for acquiring the goal shape. When the apparatus condition and the dimension data are selected as input and output of the learning model, the input and output are numerical parameters, and a multi-input and output regression model is constructed.

Alternatively, when the apparatus condition and the actual image or the structure image are selected as the input and output of the learning model, a learning model that discloses a relationship between the numerical parameter of the apparatus condition and the image is constructed. Specific examples of the model include a convolutional neural network and a generative adversarial network.

These learning models can be used to search for an optimal apparatus condition 1110A for obtaining a goal shape 1110B. As a searching method, by inputting a large number of apparatus condition sets and estimating the dimension data or the actual image shape, it is possible to select the apparatus condition that is estimated to obtain the dimension data or the actual image shape closest to the goal shape. Alternatively, the apparatus condition estimated to achieve the goal shape can be solved as an inverse problem.

Although, in these learning models, the apparatus condition 1100A is used as the input and the other data 1100B1 to 1100B4 are used as the output, it is also possible to construct a learning model by reversing the input and output and search for the optimal apparatus condition.

Fourth Embodiment

In the above embodiments, the case of processing the sample is described as an example. Features of the present disclosure can be applied to cross-sectional inspection of an object in deterioration detection as another example. When evaluating fatigue or aging of a metal or concrete, a cross section thereof is observed. Therefore, it is possible to generate a generation image by creating a structure image indicating cracks, defects, corrosion, and property change regions in the cross section as a structure image and using a reference image corresponding thereto.

Figure 9:
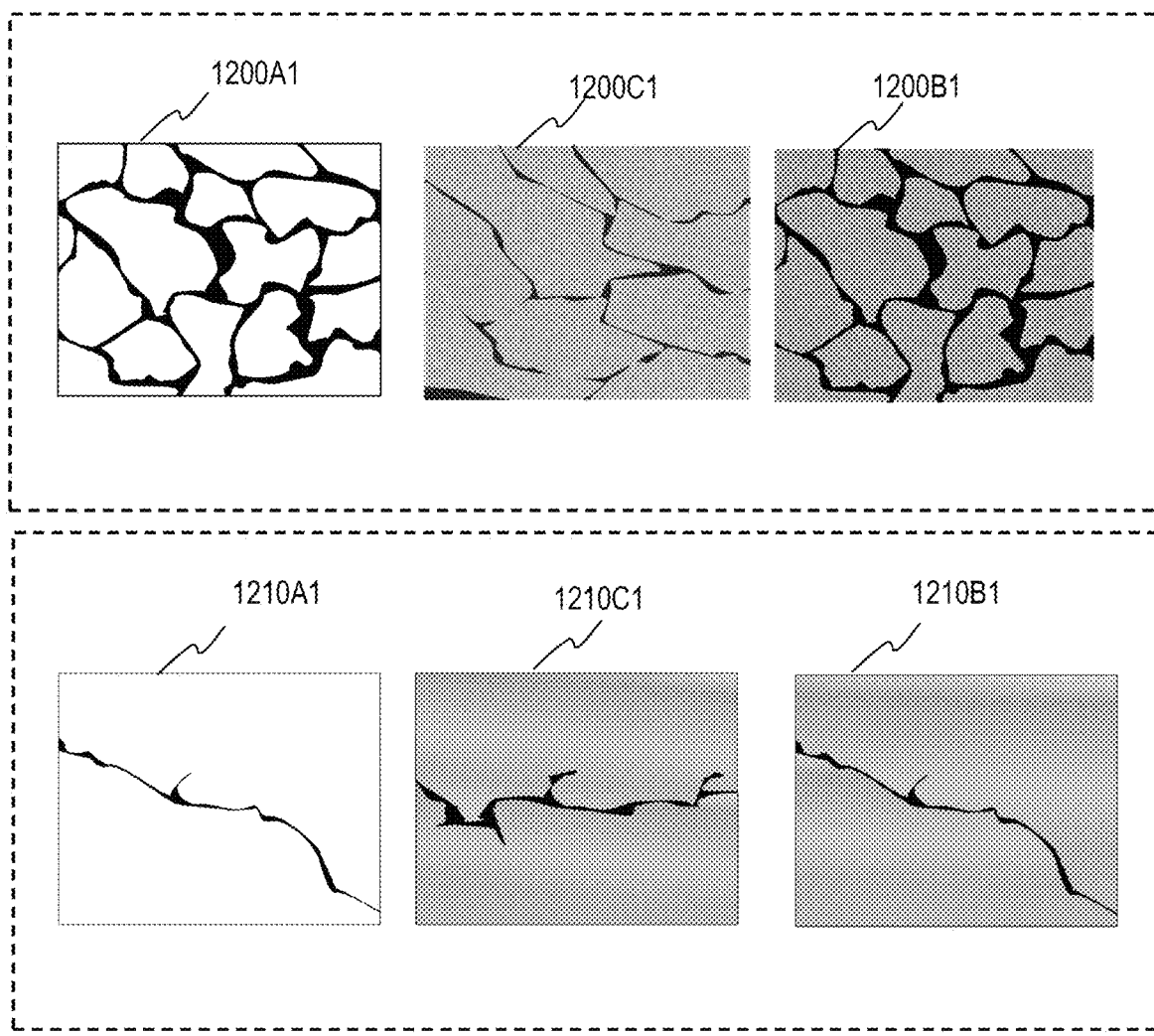

FIG. 9 shows a structure image 1200A1, a reference image 1200C1, and a generation image 1200B1 having two phase structures of islands and a boundary region of each island as an example of a metal material. FIG. 9 further shows a structure image 1210A1, a reference image 1210C1, and a generation image 1210B1 having cracks.

By the same procedure as in the first embodiment, the structure image can be acquired from the actual image, and the dimension data from the structure image, that is, the feature amount or the feature dimension of the cracks, the defects, the corrosion, and the property change regions can be acquired. In an example having the phase structure, for example, an area of islands, a maximum width of each island (width between two points that are farthest apart on a boundary line that forms the island), the number of islands, and a distance between two islands (shortest distance between points on boundary lines of two islands facing each other, or an average value of shortest distances, and the like) are used as dimension data.

In an example in which the cracks exist, for example, an area of the cracks, the number of cracks, and a width of the cracks (shortest distance between points on boundary lines of the two opposing boundaries that form the cracks, or an average value of shortest distances, and the like) are used as the dimension data. In this way, the features of the present disclosure can be applied to various types of image processing.

Fifth Embodiment

Hereinafter, a dimension extraction model and a learning method thereof will be described in detail in fifth and sixth embodiments. In the fifth embodiment, two types of image recognition technologies are used, which are a semantic segmentation model (first image recognition model) for extracting a coordinate of a boundary line between a processing structure and a background and a boundary line of an interface between different types of materials, and an object detection model (second image recognition model) for detecting a coordinate of a unit pattern. The semantic segmentation model corresponds to a structure acquisition model in the above embodiments.

In a preliminary learning step, in the semantic segmentation model, a cross-sectional SEM image that is input data and an annotation image that is color-coded for each region and is output data are given as teacher data to learn a shape of the region. In an object detection model, the cross-sectional SEM image that is the input data and annotation data that describes coordinates of a unit pattern (specified by a rectangular bounding box surrounding the pattern) and is the output data are given as the teacher data to learn a unit pattern shape.

In a prediction step, for a given input image, an image obtained by color-coding each region using the learned semantic segmentation model is estimated, and coordinates of a unit pattern are estimated using the learned object detection model.

In a measurement step, coordinates of a region boundary obtained from the color-coded image for each region are divided for each pattern using the unit pattern coordinate, and coordinates of feature points necessary for dimension measurement are obtained, so that a dimension of a desired point is automatically measured.

Figure 10:
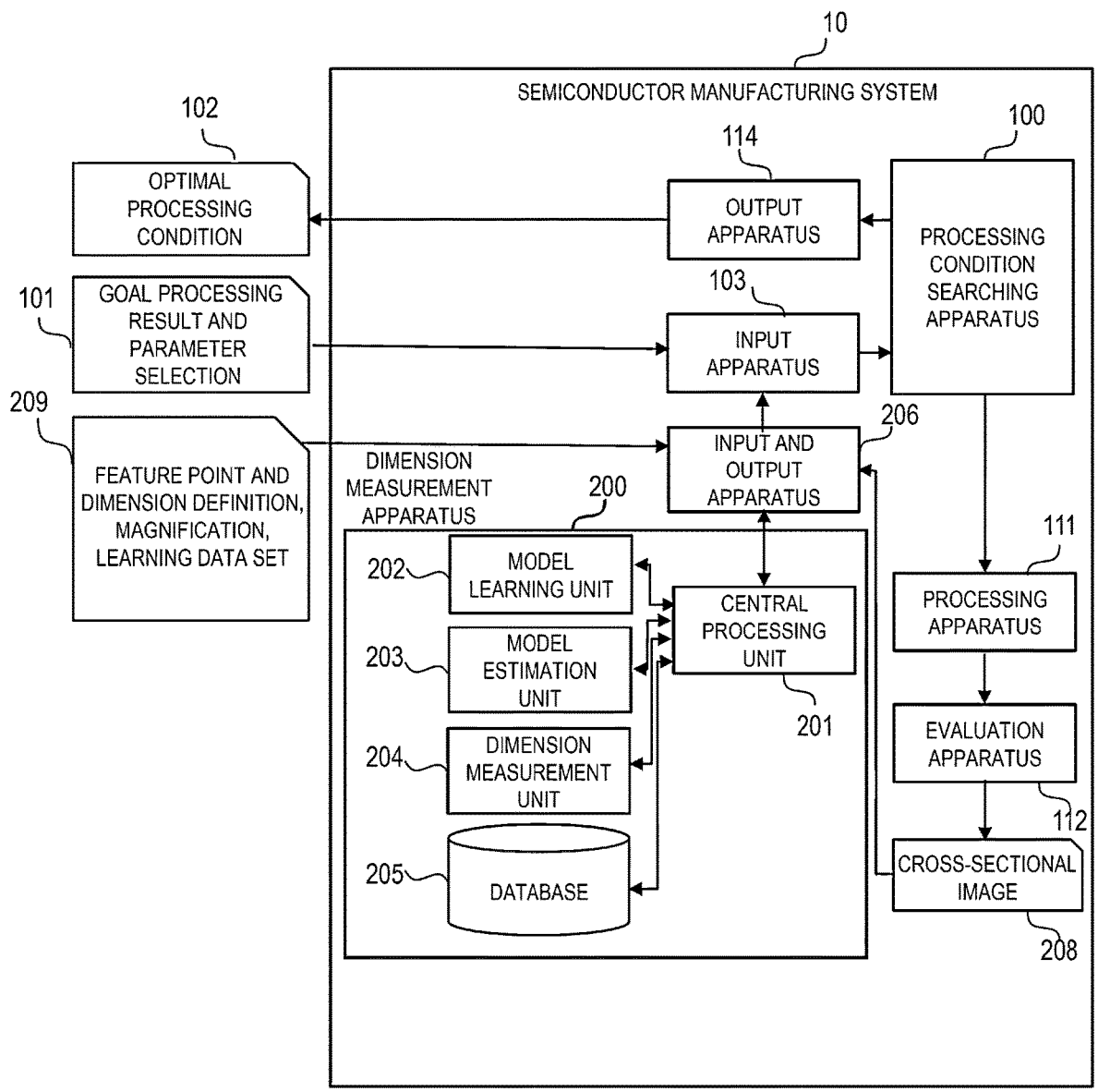
FIG. 10 shows a fifth embodiment of the invention, and is a diagram showing a system configuration example of a semiconductor manufacturing system.

FIG. 10 is a diagram showing a system configuration example of a semiconductor manufacturing system. A semiconductor manufacturing system 10 includes a processing condition searching apparatus 100, an input apparatus 103, an output apparatus 114, a processing apparatus 111, an evaluation apparatus 112, a dimension measurement apparatus 200, and an input and output apparatus 206. A user may select a goal processing result (processing shape) and a parameter 101 used in the processing apparatus 111, input the goal processing result and the parameter 101 from the input apparatus 103, and output an optimal processing condition 102 that gives a goal processing shape from the output apparatus 114.

The processing condition searching apparatus 100 is an apparatus that receives the goal processing shape 101 from the input apparatus 103, searches for a processing condition under which the processing apparatus 111 can optimally obtain the goal processing shape, and outputs the searched processing condition to the output apparatus 114.

The input apparatus 103 includes an input interface such as a GUI and a storage medium reading device such as a card reader, and inputs data to the processing condition searching apparatus 100. Not only from the user, the input apparatus 103 also receives a dimension measurement value from the input and output apparatus 206 and inputs the value to the processing condition searching apparatus 100. The input apparatus 103 includes, for example, a keyboard, a mouse, a touch panel, and a storage medium reading device.

The output apparatus 114 displays the processing condition passed from the processing condition searching apparatus 100 as the optimal processing condition 102 to the user. Methods for displaying include, for example, displaying on a display or writing to a file. The output apparatus 114 includes, for example, a display, a printer, and a storage medium writing device.

The processing apparatus 111 is an apparatus that processes a semiconductor or a semiconductor device including a semiconductor. Processing contents of the processing apparatus 111 are not particularly limited. For example, a lithographic apparatus, a film forming apparatus, and a pattern processing apparatus are included. The lithographic apparatus includes, for example, an exposure apparatus, an electron beam drawing apparatus, and an X-ray drawing apparatus. The film forming apparatus includes, for example, a chemical vapor deposition (CVD), a physical vapor deposition (PVD), a vapor deposition apparatus, a sputtering apparatus, and a thermal oxidation apparatus. The pattern processing apparatus includes, for example, a wet etching apparatus, a dry etching apparatus, an electron beam processing apparatus, and a laser processing apparatus. The processing apparatus 111 processes the semiconductor or the semiconductor device based on the processing condition input from the processing condition searching apparatus 100, and passes the semiconductor or the semiconductor device to the evaluation apparatus 112.

The evaluation apparatus 112 captures a cross section of the semiconductor or the semiconductor device processed by the processing apparatus 111, and acquires a cross-sectional image 208 as a processing result. The evaluation apparatus 112 includes a processing dimension measurement device using an SEM, a transmission electron microscope (TEM), and an optical monitor. A part of the semiconductor or semiconductor device processed by the processing apparatus 111 may be taken out as a fragment, and the fragment may be transported to the evaluation apparatus 112 and measured. The acquired cross-sectional image 208 is passed to the input and output apparatus 206.

The dimension measurement apparatus 200 includes a central processing unit 201, a model learning unit 202, a model estimation unit 203, a dimension measurement unit 204, and a database 205. The dimension measurement apparatus 200 receives a feature point and dimension definition, magnification, a learning data set 209, and the cross-sectional image 208 input via the input and output apparatus 206, measures a predetermined dimension from the cross-sectional image 208, and outputs the dimension to the input and output apparatus 206.

The input and output apparatus 206 includes an input and output interface such as a GUI and a storage medium reading device such as a card reader, and inputs the feature point and dimension definition, the magnification, and the learning data set 209 to the dimension measurement apparatus 200. The input and output apparatus 206 receives the cross-sectional image 208 from the evaluation apparatus 112 and passes the cross-sectional image 208 to the central processing unit 201. The input and output apparatus 206 includes, for example, a keyboard, a mouse, a display, a touch panel, and a storage medium reading device, and displays the dimension value passed from the dimension measurement apparatus 200 to the user or directly transfers the dimension value to the input apparatus 103. When displaying the dimension value to the user, methods include displaying on the display, writing to a file, or the like.

Figure 11:
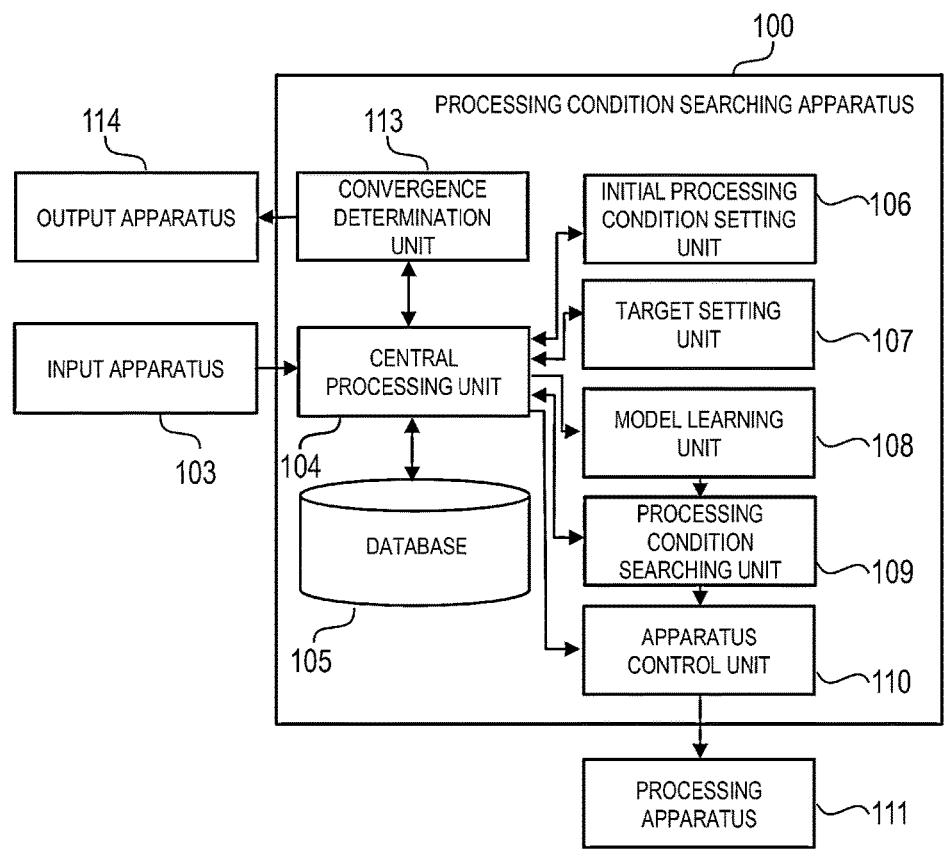
FIG. 11 shows the fifth embodiment of the invention, and is a diagram showing a system configuration example of a processing condition searching apparatus.

FIG. 11 is a diagram showing a system configuration example of the processing condition searching apparatus 100. The processing condition searching apparatus 100 includes a central processing unit 104, a database 105, an initial processing condition setting unit 106, a target setting unit 107, a model learning unit 108, a processing condition searching unit 109, an apparatus control unit 110, and a convergence determination unit 113.

Figure 12:
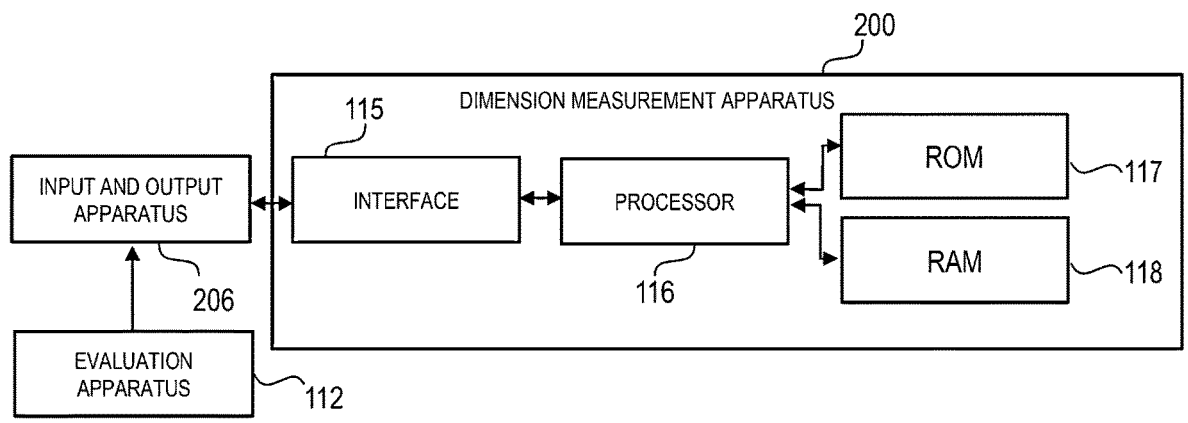
FIG. 12 shows the fifth embodiment of the invention, and is a block diagram showing a hardware configuration of a dimension measurement apparatus.

FIG. 12 is a block diagram showing a hardware configuration of the dimension measurement apparatus 200. The dimension measurement apparatus 200 measures a dimension from the cross-sectional image 208 input from the evaluation apparatus 112 via the input and output apparatus 206, and outputs a measurement result to the input and output apparatus 206. The dimension measurement apparatus 200 includes a processor 116, a communication interface 115, a ROM 117, and a RAM 118. The communication interface 115 connects the processor 116 and the external input and output apparatus 206. The processor 116 connects the communication interface 115, the ROM 117, and the RAM 118. A processing program executed by the processor 116 is stored in the ROM 117. Learning data, a learning model, a feature point and dimension definition, magnification, and the like are stored in the RAM 118.

In correspondence with the dimension measurement apparatus 200 shown in FIG. 10, the database 205 is installed as the ROM 117 and the RAM 118, and the model learning unit 202, the model estimation unit 203, and the dimension measurement unit 204 are installed as programs and parameters stored in the ROM 117 and the RAM 118.

Figure 13:
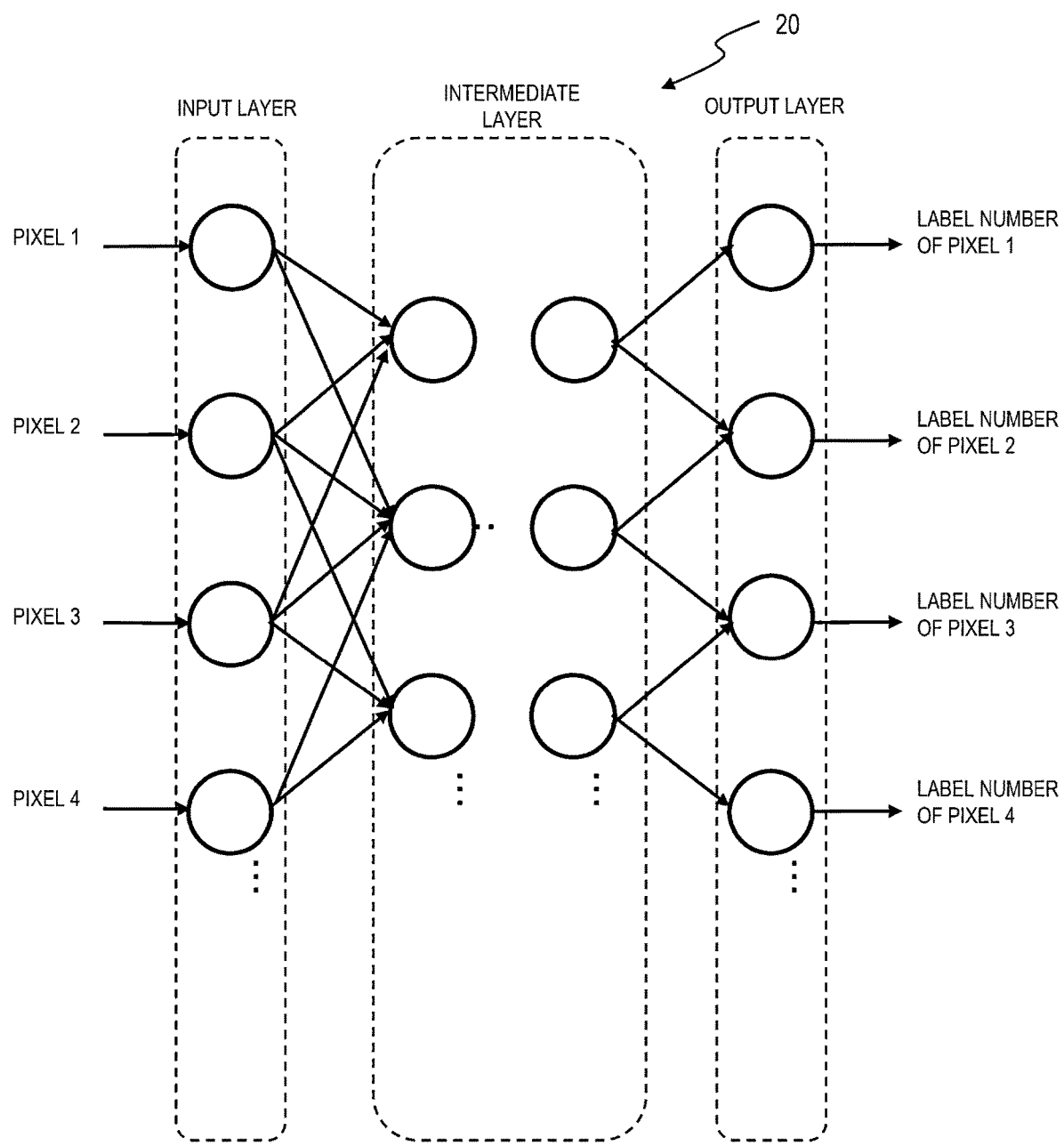
FIG. 13 shows the fifth embodiment of the invention, and is a diagram showing an example of a semantic segmentation model.

FIG. 13 shows an example of a configuration of a semantic segmentation model used by the model learning unit 202 and the model estimation unit 203 of the dimension measurement apparatus 200. In the example, a neural network 20 is used. However, the invention is not limited thereto, and a machine learning model such as a decision tree may be used. With pixel information input to an input layer sequentially transmitted to an intermediate layer and an output layer and calculated, the neural network outputs a label number of a region to which each pixel belongs from the output layer. In the intermediate layer, a convolutional layer, a pooling layer, and the like are repeated for many layers. A specific layer structure is different depending on the model employed. At the time of learning, parameters of the intermediate layer are adjusted so that an error between the label of each pixel output and annotation data that is a correct answer is minimized.

Figure 14:
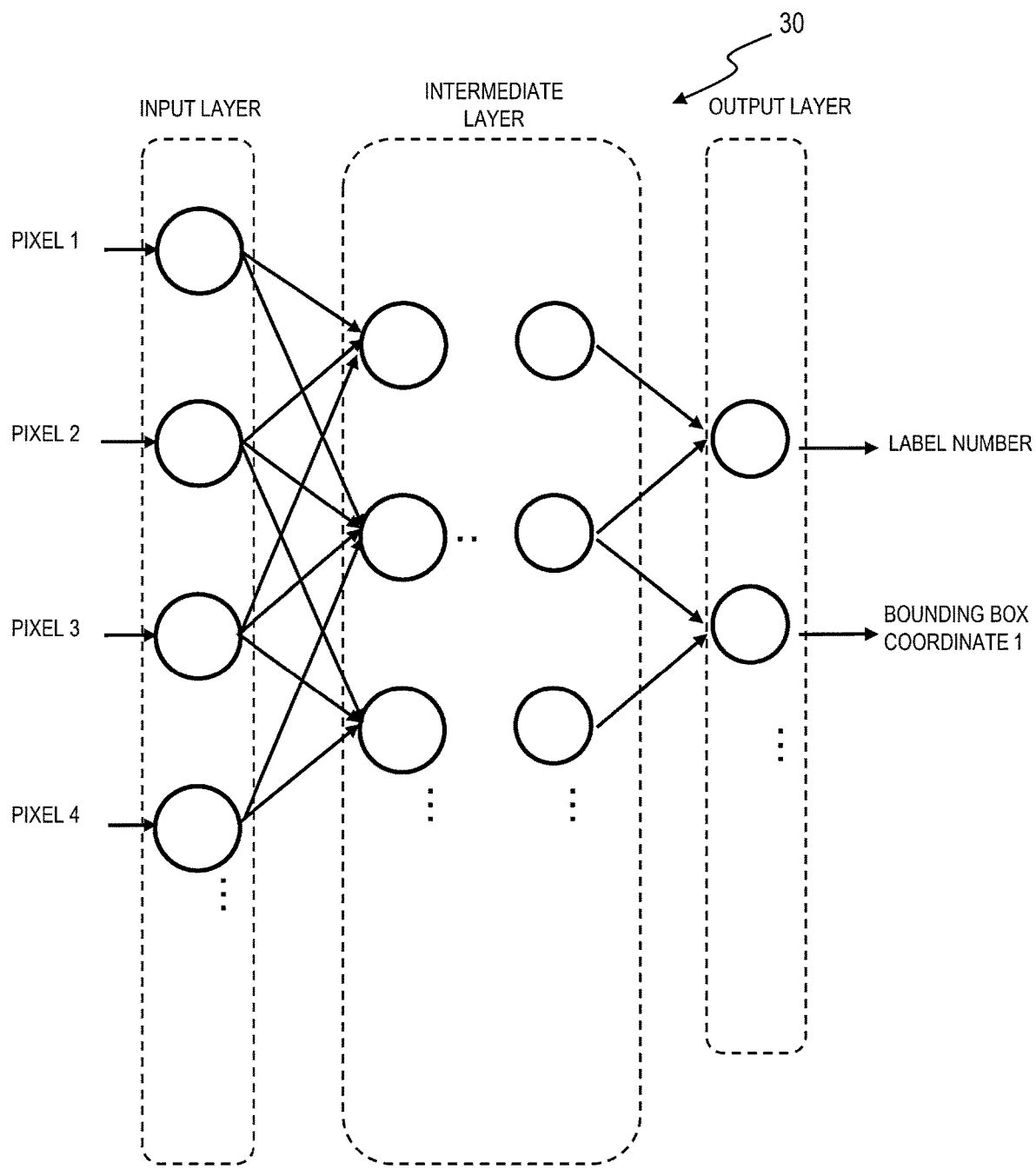
FIG. 14 shows the fifth embodiment of the invention, and is a diagram showing an example of an object detection model.

FIG. 14 shows an example of a configuration of an object detection model used by the model learning unit 202 and the model estimation unit 203 of the dimension measurement apparatus 200. In the example, a neural network 30 is used. However, the invention is not limited thereto, and other models such as template matching may be used. With pixel information input to an input layer sequentially transmitted to an intermediate layer and an output layer and calculated, the neural network outputs a label number of an object included in an image and coordinate values of a bounding box from the output layer. In the intermediate layer, a convolutional layer, a pooling layer, and the like are repeated for many layers. A specific layer structure is different depending on the model employed. At the time of learning, parameters of the intermediate layer are adjusted so that an error between the label number of the object, the coordinate values of the bounding box output and annotation data that is a correct answer is minimized.

Figure 15:
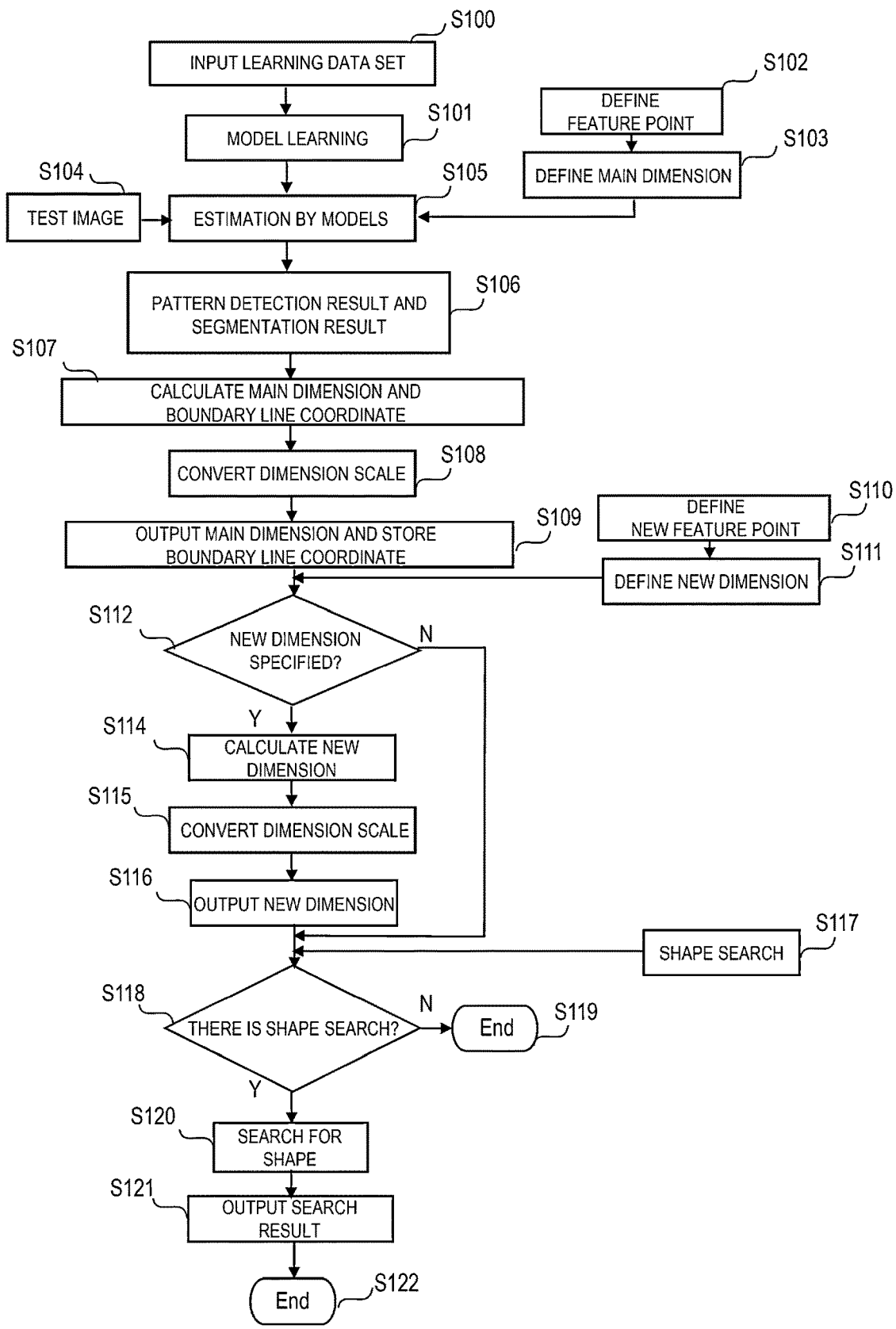
FIG. 15 shows the fifth embodiment of the invention, and is a flowchart in which the dimension measurement apparatus measures a dimension based on an input image.

FIG. 15 is a flowchart executed by the dimension measurement apparatus 200 until a required dimension is measured from an input image.

First, the learning data set 209 to be input to the dimension measurement apparatus 200 is created in advance. The learning data set creates, in addition to the cross-sectional SEM image that is input data, a set of annotation images 209 in which annotation data 209, which describes coordinates of a bounding box surrounding a unit pattern for the object detection model and is output data, is color-coded for each region for the semantic segmentation model, and the learning data set is input from the input and output apparatus 206 (step S100). The input learning data set is stored in the database 205.

Next, the central processing unit 201 transfers the learning data set and a model from the database 205 to the model learning unit 202, and performs learning of two models by the model learning unit 202 (step S101). Parameters of the learned models are stored in the database 205. In the following description, a neural network having a convolutional layer and a pooling layer is used as a model. A machine learning model such as a decision tree can also be used as a semantic segmentation model, and a machine learning model such as template matching can also be used as an object detection model.

Next, in the prediction step, a test image whose dimension is to be measured is input from the input and output apparatus 206 (step S104). At the same time, a definition 209 of a feature point required for the dimension measurement and the definition 209 of a dimension to be measured are stored in the database 205 via the input and output apparatus 206 (steps S102 and S103). The magnification of the input image is determined by a name of a folder storing the image. For example, if the magnification is 100 k times, the folder name is assumed to be 100 k. Magnification information of each image is stored in the database 205. The central processing unit 201 passes the models and parameters from the database 205 to the model estimation unit 203, passes the input test image, and performs estimation by the model estimation unit 203 (step S105), and obtains a bounding box coordinate that is a pattern detection result and a semantic segmentation image (step S106).

Next, in the measurement step, the central processing unit 201 passes the bounding box coordinate and the semantic segmentation image to the dimension measurement unit 204, and obtains coordinates of a boundary line based on the semantic segmentation image. Next, the boundary line coordinates are divided for each pattern, coordinates of feature points are obtained by calling the feature point definition stored in the database 205, and main dimensions are calculated by calling the dimension definition (step S107). Since the unit of the obtained dimension is the number of pixels, the magnification stored in the database 205 is called and converted to an actual dimension (step S108). A measured dimension value is output to the input and output apparatus 206, and boundary line coordinate data for each pattern is stored in the database 205 (step S109).

Further, when a dimension measurement point is to be newly added, the definition 209 of the new feature point required for dimension measurement and the definition 209 of the new dimension measurement point are input from the input and output apparatus 206 and stored in the database 205 (steps S110 and S111).

Next, it is determined whether or not a new dimension measurement point is specified (step S112), and if there is no specification, the dimension measurement processing is skipped. If there is a specification, coordinate data of the boundary line for each pattern stored in the database 205 is read out to calculate the dimension (step S114), and after scale conversion to the actual dimension (step S115), a measured dimension value is output to the input and output apparatus 206 (step S116).

Here, when it is desired to search for a processing shape, a goal dimension value is input (step S117). The central processing unit 201 determines whether or not a shape searching is specified (step S118). If there is no specification, the central processing unit 201 ends the dimension measurement processing (step S119). If there is a specification, all dimension values of the image stored in the database 205 are searched (step S120), and a shape close to the input dimension is output to the input and output apparatus 206 (step S121). Thus, the processing ends (step S122).

Figure 16:
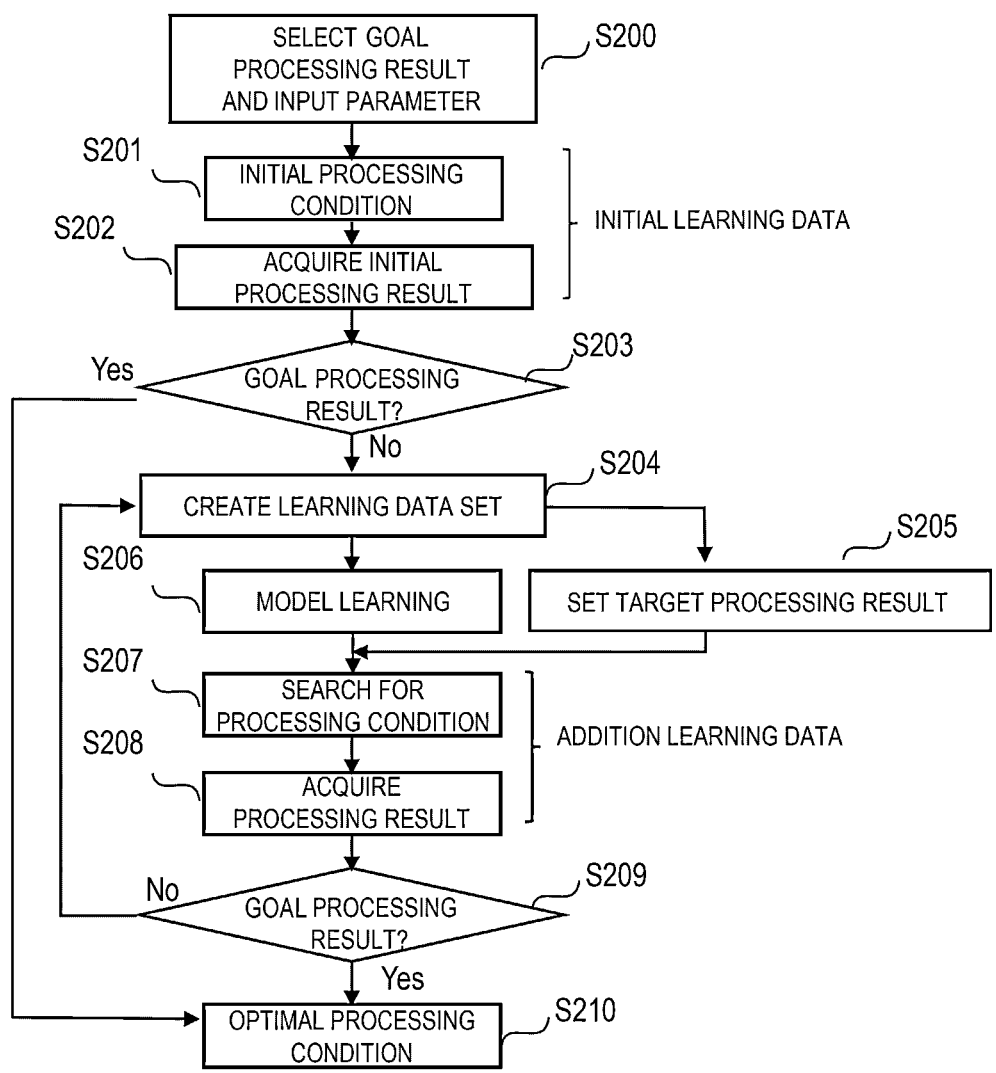
FIG. 16 shows the fifth embodiment of the invention, and is a flowchart in which the processing condition searching apparatus searches for a processing condition.

FIG. 16 is a flowchart of determining an optimal processing condition of the processing apparatus 111 based on a goal processing result (goal output parameter value) executed by the processing condition searching apparatus 100 in the semiconductor manufacturing system 10.

First, regarding the processing performed by the processing apparatus 111, a goal processing result (goal output parameter value) as a goal and the input parameter 101 selected as a parameter for controlling the processing apparatus 111 are transferred from the input apparatus 103 to the central processing unit 104 (step S200).

Next, the central processing unit 104 stores the received goal output parameter value and the selected input parameter (processing condition parameter) in the database 105, and passes the selected input parameter to the initial processing condition setting unit 106. The initial processing condition setting unit 106 reads data of a settable range of the input parameter from the database 105 based on the passed input parameter, and automatically sets an initial processing condition (step S201). The central processing unit 104 stores the set initial processing condition in the database 105, and passes the initial processing condition to the apparatus control unit 110.

The apparatus control unit 110 transfers the initial processing condition to the processing apparatus 111. Alternatively, the user may input the initial processing condition output by the apparatus control unit 110 to the processing apparatus 111. The processing apparatus 111 performs processing in accordance with the input initial condition, performs evaluation by the evaluation apparatus 112, and passes the cross-sectional image 208 which is an evaluation result to the dimension measurement apparatus 200 via the input and output apparatus 206. The dimension value (goal output parameter value) obtained by the dimension measurement apparatus 200 is input to the input apparatus 103 via the input and output apparatus 206. The central processing unit 104 receives an initial processing result from the input apparatus 103 (step S202). The central processing unit 104 passes the initial processing condition and the initial processing result to the convergence determination unit 113.

The convergence determination unit 113 compares the initial processing result with the goal processing result and determines whether or not the result converges to the goal processing result within predetermined accuracy (step S203). If converging, the initial processing condition converging to the goal processing result is passed to the output apparatus 114, and the output apparatus 114 outputs the initial processing condition as the optimal processing condition 102 (step S210).

The convergence of the output parameter value (processing result) can be determined using a sum of squares of an error between the goal output parameter value and the output parameter value for all output parameters to be used, which is given by Formula 1.

$$\Sigma_{i=1}^{NP}(x_i-y_i)^2 \cdot W_i \qquad \text{(Formula 1)}$$

Here, NP is a total number of the output parameters used, $x_i$ is an i-th goal output parameter value, $y_i$ is an i-th output parameter value (actual value), and $W_i$ is a weight specified by the user for each output parameter.

On the other hand, if not converging, an instruction to continue processing is sent from the convergence determination unit 113 to the central processing unit 104, and the central processing unit 104 creates initial learning data including the initial processing condition (initial input parameter value) and the initial processing result (initial output parameter value) in the database 105 (step S204).

Next, the central processing unit 104 reads the goal output parameter value (goal processing result) and the initial learning data from the database 105 and passes them to the target setting unit 107. The target setting unit 107 sets a goal processing result (goal output parameter value) (step S205). The set goal output parameter value is passed to the central processing unit 104 and stored in the database 105. The target setting unit 107 selects best data (output parameter value (actual value)) closest to the goal output parameter value from the existing learning data, and sets the goal output parameter value by interpolating between the best output parameter value and the goal output parameter value at that time. Although the number of targets to be set may be any number as long as it is one or more, it is desirable to set a plurality of, for example, about 4 to 5 targets in consideration of efficiency.

Next, the central processing unit 104 reads the initial learning data from the database 105 and sends the initial learning data to the model learning unit 108. The model learning unit 108 learns an estimation model that relates to the input parameter value (processing condition) and the output parameter value (processing result) (step S206). As the estimation model, a neural network, a support vector machine, a kernel method, or the like can be used. The learned estimation model is passed to the processing condition searching unit 109.

Next, the processing condition searching unit 109 uses the estimation model passed from the model learning unit 108 and a constraint on the input parameter read from the database 105 to search for a goal output parameter value read from the database 105 and a processing condition for the goal output parameter value (step S207). Since in the estimation model, the processing condition is input and the processing result is output, in order to reversely determine the processing condition from the processing result, various optimal solution searching methods such as a simulated annealing method and a genetic algorithm can be used. The processing condition searching unit 109 passes the searched processing condition (target input parameter value) to the apparatus control unit 110, and stores the processing condition in the database 105 via the central processing unit 104.

The apparatus control unit 110 transfers the passed processing condition (target input parameter value) to the processing apparatus 111. Alternatively, the user may input the processing condition output by the apparatus control unit 110 to the processing apparatus 111. The processing apparatus 111 performs processing in accordance with the input initial condition, performs evaluation by the evaluation apparatus 112, and passes the cross-sectional image 208 which is the evaluation result to the dimension measurement apparatus 200 via the input and output apparatus 206. The dimension value (goal output parameter value) obtained by the dimension measurement apparatus 200 is input to the input apparatus 103 via the input and output apparatus 206. The central processing unit 104 receives the processing result (goal output parameter value) from the input apparatus 103 (step S208). The central processing unit 104 passes the processing condition (target input parameter value) and the processing result (goal output parameter value) to the convergence determination unit 113.

The convergence determination unit 113 compares the processing result (output parameter value (actual value)) with the goal processing result (goal output parameter value), and determines whether or not the processing result converges to the goal processing result within predetermined accuracy (step S209). If converging, the processing condition converging to the goal processing result is passed to the output apparatus 114, and the output apparatus 114 outputs the initial processing condition as the optimal processing condition 102 (step S210).

On the other hand, if not converging, an instruction to continue processing is sent from the convergence determination unit 113 to the central processing unit 104, the central processing unit 104 adds a set of the processing condition (input parameter value) and the processing result (output parameter value (actual value)) for a newly searched goal processing result and the goal processing result to the learning data set of the database 105 as additional learning data, so that the learning data set is updated (step S204).

Hereinafter, the estimation process from creation and update of the learning data set (step S204) to convergence determination (step S209) is repeated until the processing result converges to the goal processing result. In this way, the optimal processing condition for implementing the goal processing result is searched for autonomously.

The processing flow of the entire semiconductor manufacturing system 10 including the processing condition searching apparatus 100 and the dimension measurement apparatus 200 is described above.

Figure 17:
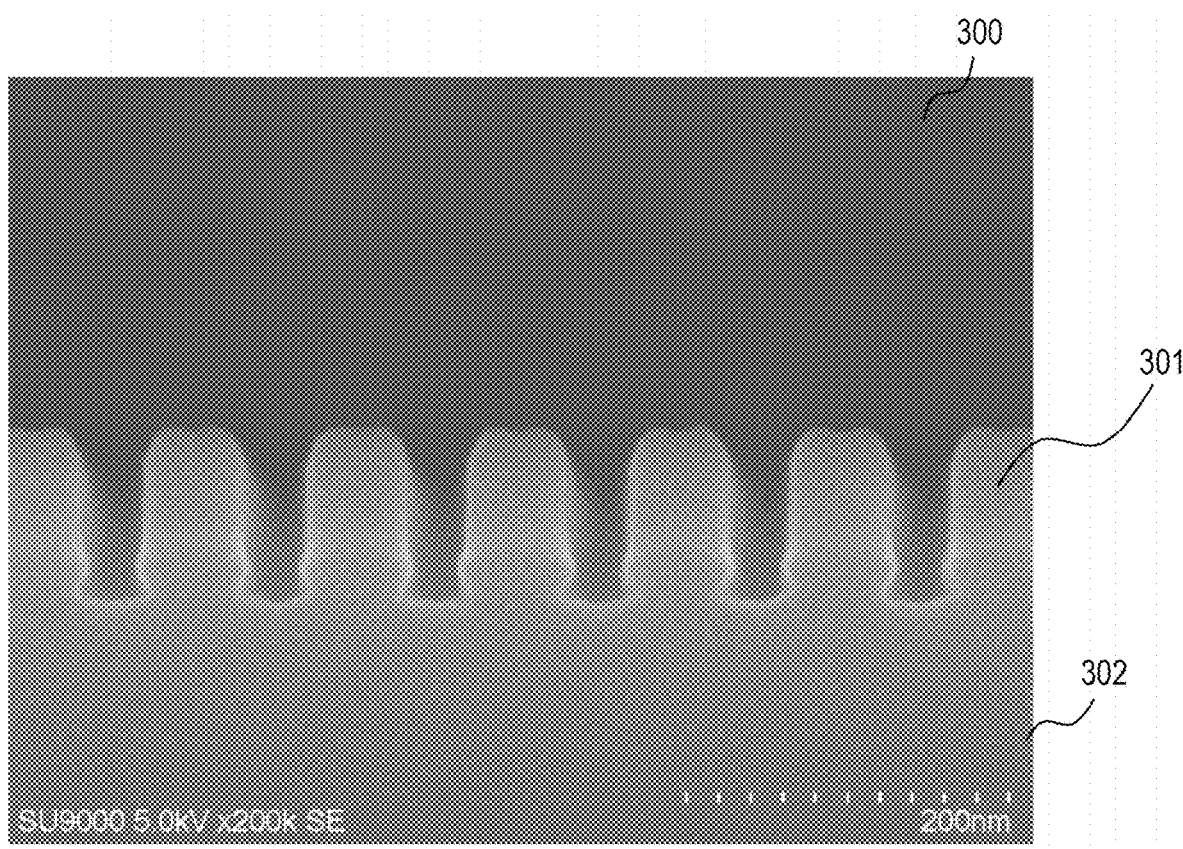
FIG. 17 shows the fifth embodiment of the invention, and is an example of an input data set (cross-sectional image).

Hereinafter, a case where the processing apparatus 111 is an etching apparatus will be described as an example. FIG. 17 shows an example of a cross-sectional SEM image that is input data set in the learning data set. A size of the image is 1280×960 pixels. The sample is a trench structure in which unit patterns of line/space are repeated, and includes three regions of a background 300, a mask 301, and a substrate 302. A capturing condition is superimposed on the lower left of the image, and a scale is superimposed on the lower right of the image.

Figure 18:
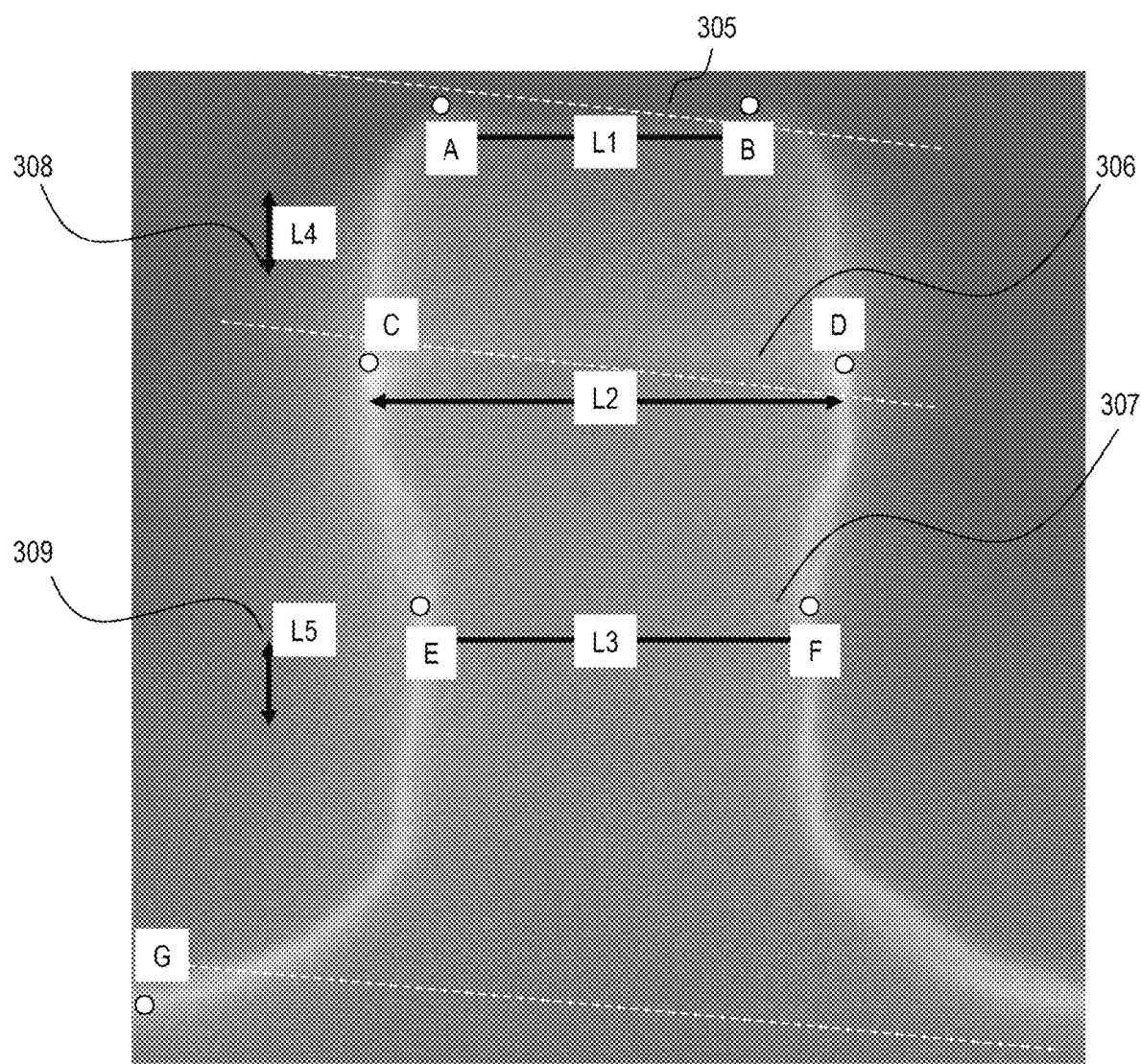
FIG. 18 shows the fifth embodiment of the invention, and is an example of a dimension measurement point.

FIG. 18 shows an example of a dimension measurement point. In this example, the dimension measurement point includes five parts of (1) L1: a mask upper surface width 305, (2) L2: a mask/substrate interface width 306, (3) L3: a substrate narrowest portion width 307, (4) L4: a mask height 308, and (5) L5: a trench depth 309. The mask upper surface width 305 is defined as an interval between two peak positions having a convex shape. When the shape has only one peak position, the width is set to 0. Seven points A to G in the figure are feature points on a boundary line used for dimension measurement, and points that can be uniquely defined only from boundary line data are used. For example, A and B are peak points on the mask upper surface. The definition of the feature points A to G and the correspondence between the dimensions L1 to L5 and the feature points A to G (L1: A, B, L2: C, D, etc.) are input by the user via the input and output apparatus 206 and stored in the database 205. Specifically, a script describing the definition of the feature point and the definition of the dimension is stored. The number and positions of the feature points and the measurement dimensions are appropriately set according to the structure of the measurement target.

Figure 19:
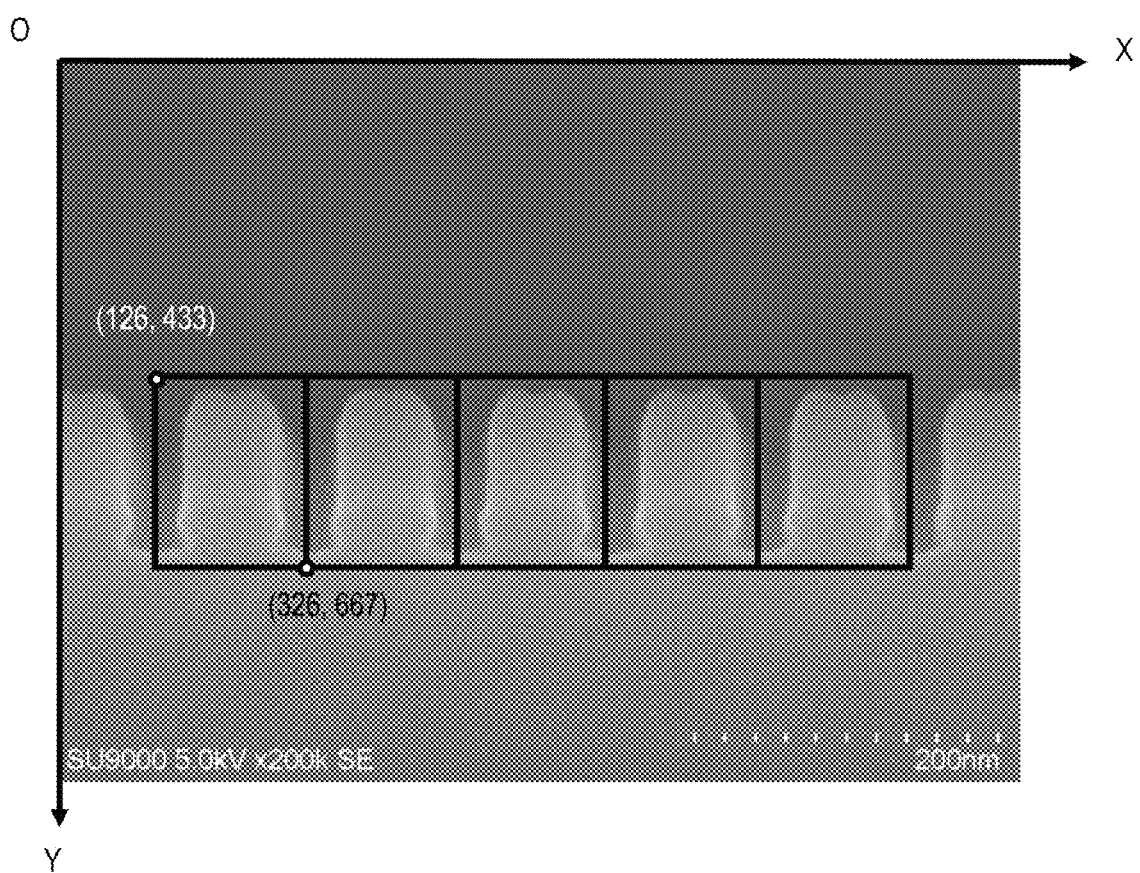
FIG. 19 shows the fifth embodiment of the invention, and is a diagram showing a coordinate system of a bounding box.

FIG. 19 is a diagram showing the definition of coordinates of the bounding box described in annotation data to be given to the object detection model among the annotation data which is the output data set in the learning data set. A label name "pattern" is defined for a region formed by a mask and a part of the substrate, which is a unit structure of line/space repetition surrounded by a frame (bounding box) shown in the drawing. In this example, the label has only one type, and the label number is 0. There are five patterns in FIG. 19. Coordinates of bounding boxes have an origin at the upper left of the image, an X axis in a horizontal direction, and a Y axis in a vertical direction. A boundary in the Y axis direction of the bounding boxes is set to positions respectively with a margin of several pixels so that a mask upper portion and a trench bottom are completely included. Since the bounding box is rectangular, two coordinates on the upper left and the lower right may be given to specify the position.

FIG. 20 is an excerpt of a description example of the annotation data corresponding to FIG. 19. Only main items are extracted. Although data is described in an xml format in this example, any format assumed by the object detection model used may be used. A name of a folder storing an image file is described in tags <folder> to </folder>, and an image file name is described in tags <filename> to </filename>. Tags <object> to </object> are locations where information related to the bounding box is described, and are repeated by the number of bounding boxes included in the image. Tags <name> to </name> in the tags <object> to </object> are locations where label names are speicified. Four numerical values described in tags <bndbox> to </bndbox> are coordinates of the upper left and the lower right points of a first bounding box. Annotation data can be created manually or created using a learned object detection model.

Figures 21, 22:
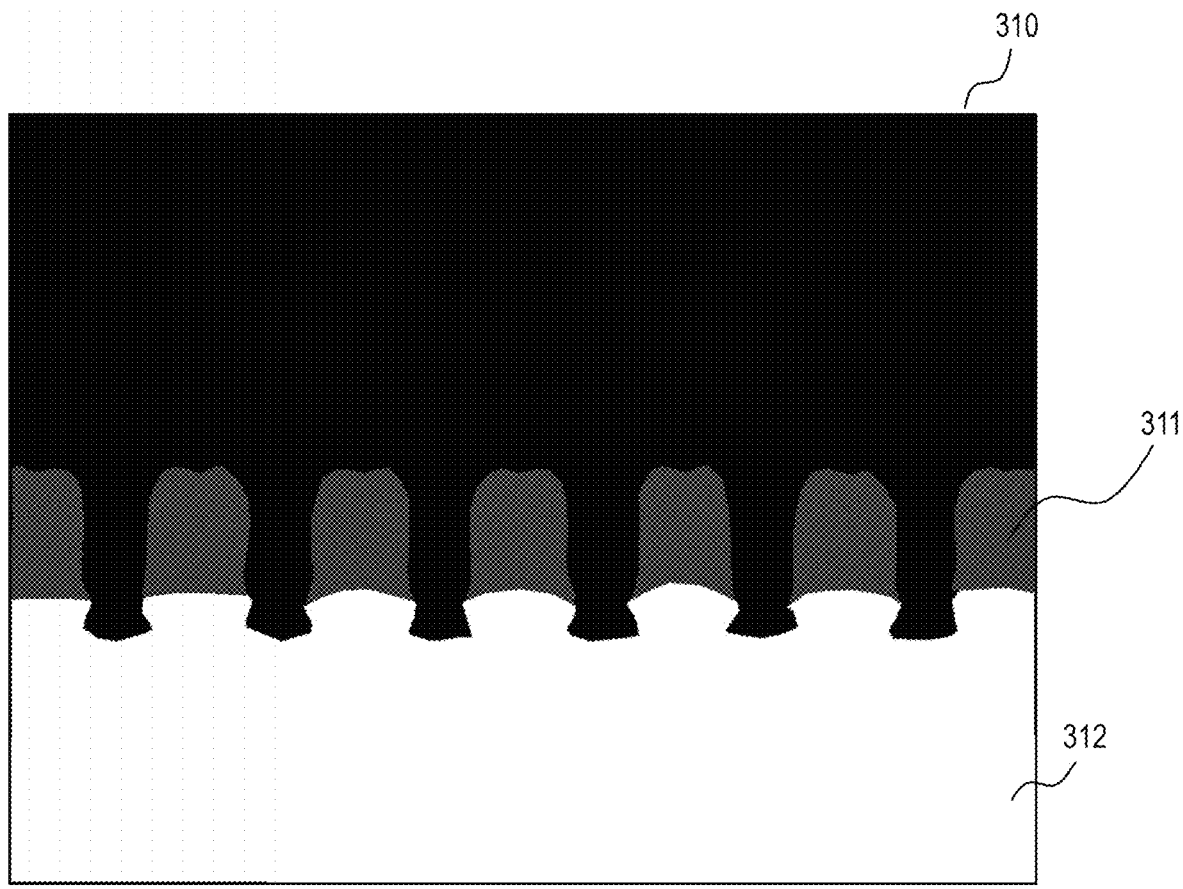
FIG. 21 shows the fifth embodiment of the invention, and is an example of annotation data used for learning of a semantic segmentation model.
FIG. 22 shows the fifth embodiment of the invention, and is a table showing a correspondence among a label name, a label number, and a color in the annotation data used for learning of the semantic segmentation model.

FIG. 21 shows an example of the annotation data for a semantic segmentation model among the annotation data that is an output data set in the learning data set. The annotation data can be created manually using dedicated software, or can be created using the learned semantic segmentation model. The data is an image color-coded for each region. Here, the region includes each layer constituting a cross section of the semiconductor device to be measured and a background other than the cross section of the semiconductor device. This example includes three regions of a background 310, a mask 311 as each layer constituting the cross section of the semiconductor device, and a substrate 312. The label names of the three regions are "background", "mask", and "substrate", and the colors are black, gray, and white.

FIG. 22 shows a correspondence among the label names, the label numbers, and the colors, and is stored in the database 205. Although the label number and the color given to each label are arbitrary, it is necessary to fix the label number and the color in the dimension measurement apparatus 200.

Figure 23:
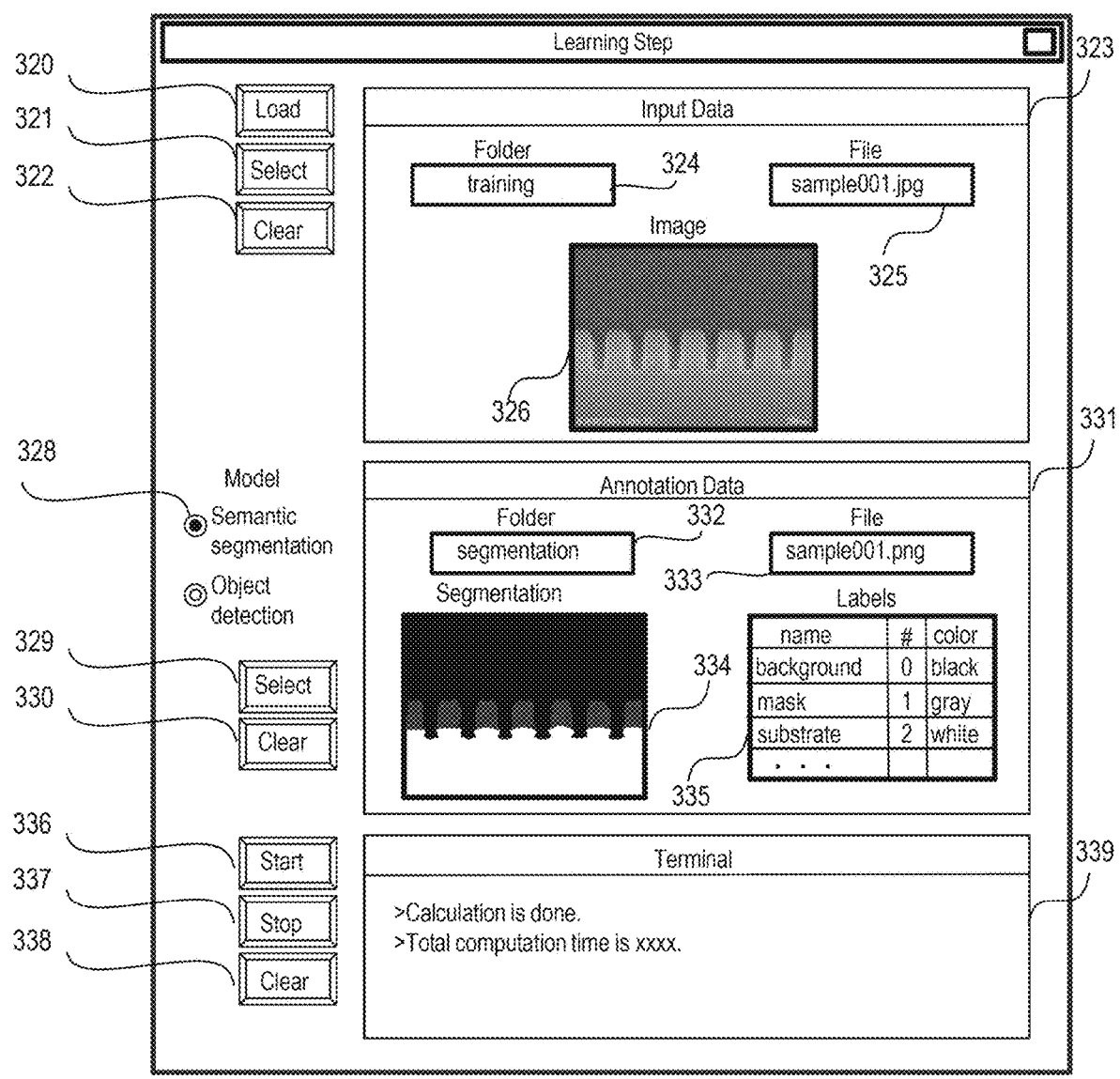
FIG. 23 shows the fifth embodiment of the invention, and is an example of a GUI screen displayed at the time of a learning step.

FIG. 23 shows an example of a GUI screen displayed on the input and output apparatus 206 when performing the learning step. The screen includes an input data window 323, an annotation data window 331, and a terminal window 339. In the input data window 323, a folder in which the input data set of the learning data set is stored is selected by a load button 320. An image file to be displayed in the input data window 323 is selected by a select button 321. A display result is cleared by a clear button 322. The selected folder name and file name are displayed in cells 324 and 325. The selected image is displayed in an image window 326.

In the annotation data window 331, any one of the semantic segmentation model or the object detection model is selected by a model button 328. The type of data displayed in the annotation data window 331 changes according to the selected model. The folder including the annotation data is also automatically selected according to the model. FIG. 23 shows an example of a case where the semantic segmentation model is selected. A sample to be displayed in a window 334 is specified by a select button 329. A folder name and a file name of the selected sample are displayed in cells 332 and 333. An annotation image is displayed in the window 334, and a correspondence table of the label names, the label numbers, and the colors is displayed in a table 335.

In the terminal window 339, learning of the model selected by the model button 328 is started by a start button 336. In the terminal window 339, a progress of the calculation and a final result are displayed as messages. A stop button 337 can be used to stop the calculation even in progress. A learned model, which is a calculation result, is automatically stored.

Figure 24:
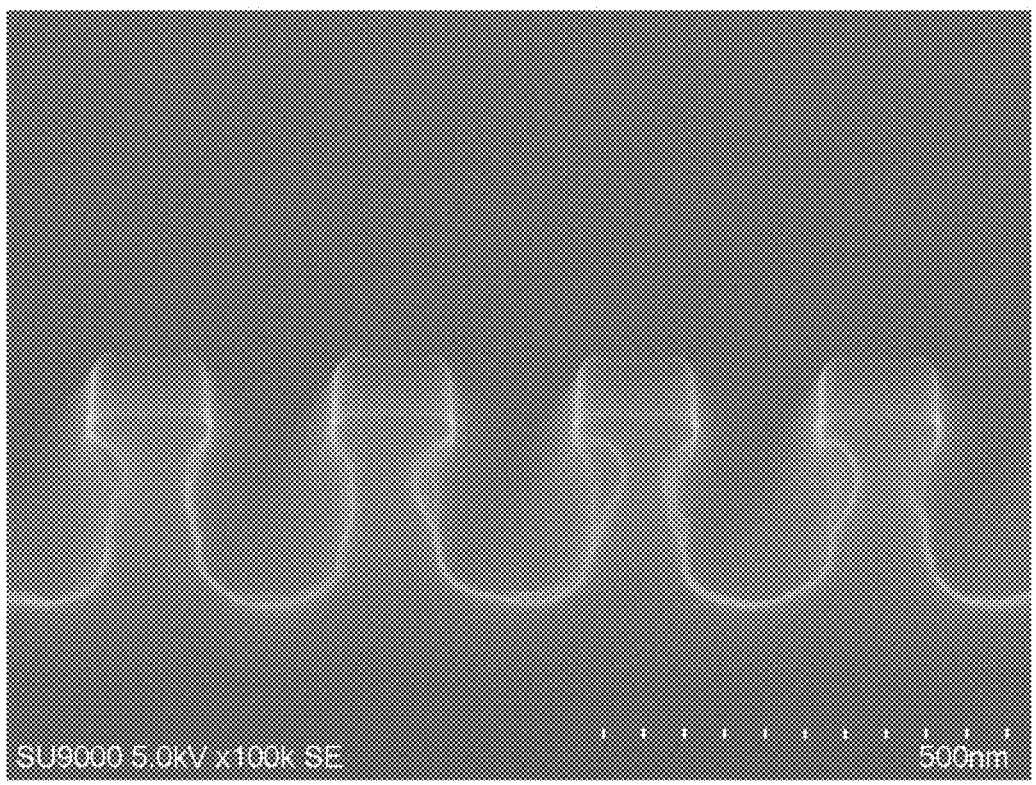
FIG. 24 shows the fifth embodiment of the invention, and is an example of a test image for measuring a dimension.

FIG. 24 shows an example of a test image whose dimension is to be measured. As described above, a contour of an unnecessary deep structure is shown in the test image. The structure is to be ignored at the time of dimension measurement.

Figure 25:
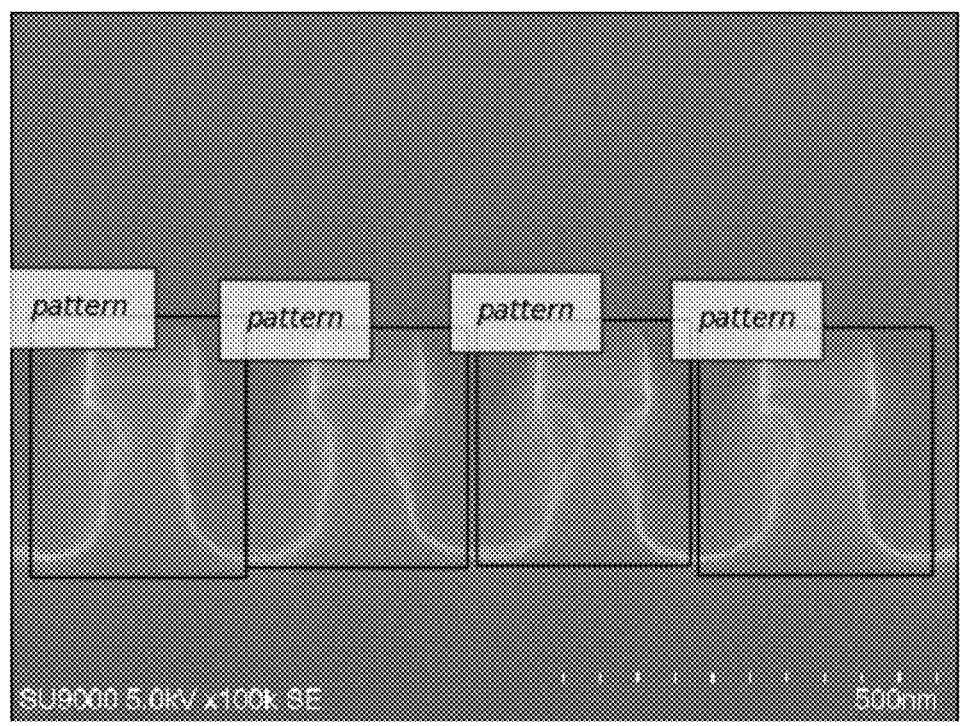
FIG. 25 shows the fifth embodiment of the invention, and is a diagram showing an object detection result obtained by inputting the test image into a learned object detection model.

FIG. 25 shows a result obtained by inputting the test image shown in FIG. 24 into the learned object detection model and performing the prediction. Together with the label names of the detected objects, bounding box coordinates are indicated by black frames. In the example of FIG. 25, four patterns are detected.

Figures 26, 27:
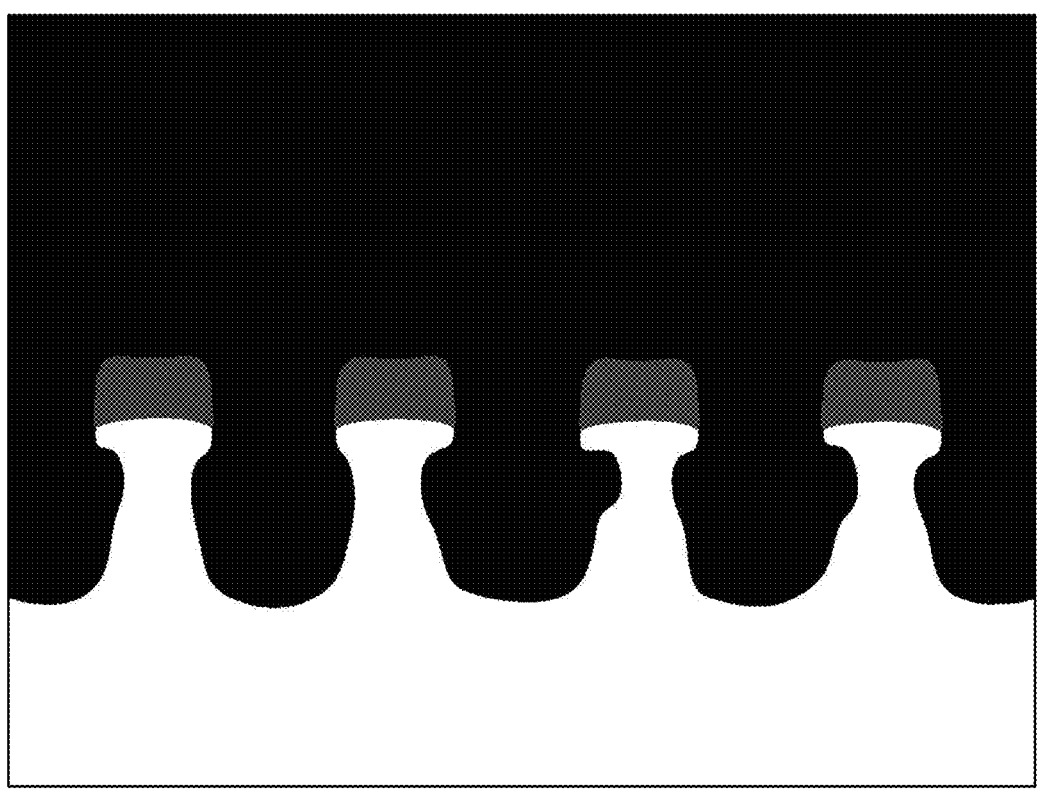
FIG. 26 shows the fifth embodiment of the invention, and is a table showing coordinates of bounding boxes obtained by inputting the test image into the learned object detection model.
FIG. 27 shows the fifth embodiment of the invention, and is a diagram showing a semantic segmentation result obtained by inputting the test image into a learned semantic segmentation model.

FIG. 26 shows coordinate value data of the bounding boxes corresponding to FIG. 25, and is automatically stored in the database 205 after prediction.

FIG. 27 shows a result obtained by inputting the test image shown in FIG. 24 into the learned semantic segmentation model and performing the prediction. The color of each region follows the correspondence set in FIG. 22, that is, the background is black, the mask is gray, and the substrate is white.

Since the coordinates of the boundary lines of the regions are obtained from FIG. 27, the boundary line coordinates are cut out for each bounding box using the coordinate values of the bounding boxes in FIG. 26. Coordinates of the feature points A to G necessary for dimension measurement are obtained based on the cut-out boundary line coordinates of each bounding box, and the dimensions L1 to L5 are obtained. In this way, the dimension is automatically measured for each pattern based on the input image.

Figures 28, 29:
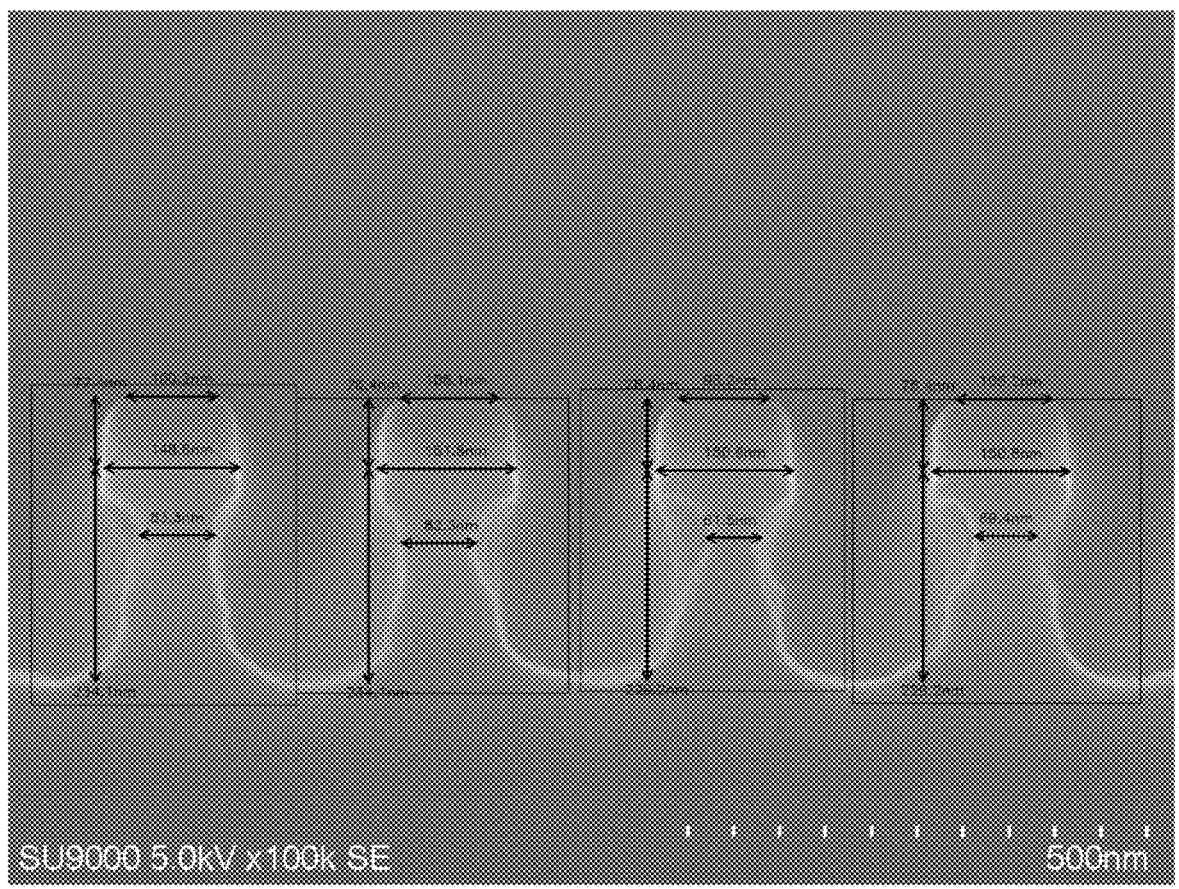
FIG. 28 shows the fifth embodiment of the invention, and is a diagram showing bounding boxes and dimension measurement results on the test image.
FIG. 29 shows the fifth embodiment of the invention, and is a table showing dimension values measured for each pattern.

FIG. 28 shows an example in which the measured dimension values are displayed on the original input image, and the detected bounding box positions are also shown as rectangles.

FIG. 29 shows measurement results of FIG. 28. In the five dimensions L1 to L5, statistical values (average value, standard deviation) are also calculated and displayed in addition to the values for each pattern. The results are automatically stored in the database 205, and the average values are output to the input and output apparatus 206.

Figure 30:
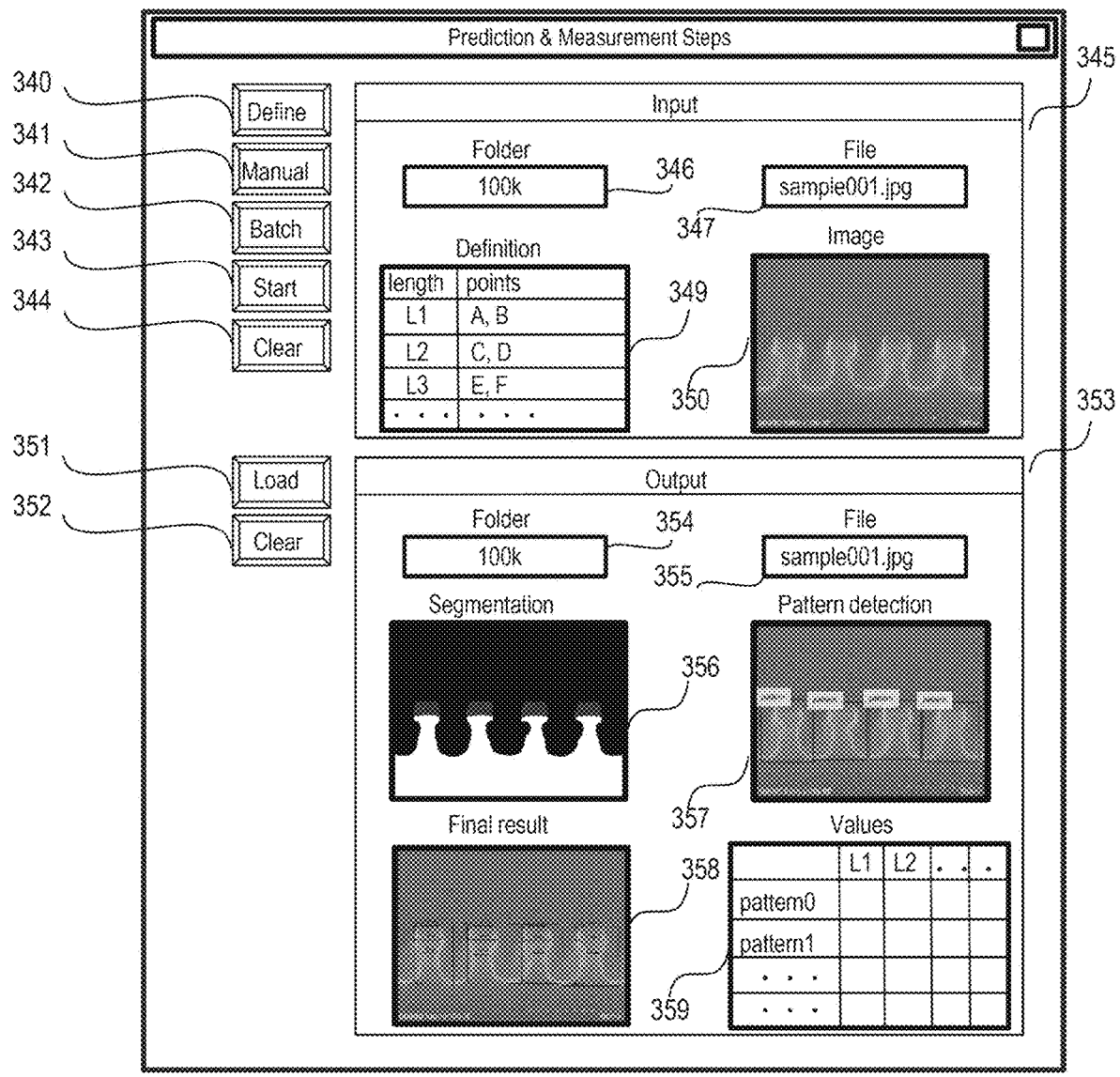
FIG. 30 shows the fifth embodiment of the invention, and is an example of a GUI screen displayed at the time of a prediction and measurement step.

FIG. 30 shows an example of a GUI screen displayed on the input and output apparatus 206 when performing the prediction and the measurement steps. The screen includes an input data window 345 and a prediction and measurement result window 353. In the input data window 345, a script defining a correspondence between the feature points and the dimension is read by a define button 340. The read definition is displayed in a definition table 349. Next, it is selected whether to perform prediction and measurement by selecting test images one by one by a manual button 341 or to specify a folder including the test images and perform prediction and measurement for all images in the folder at once by a batch button 342. By making the folder name match the magnification of the image, information on the magnification can be obtained from the folder name. The selected folder name and file name are displayed in cells 346 and 347. The selected test image is displayed in an image window 350. When the batch is selected, the file name and the image of a first test image are displayed in the cell 347 and the image window 350. Prediction and dimension measurement are performed using two learned models by a start button 343. A calculation result is automatically stored. A display result is cleared by a clear button 344.

In the prediction and measurement result window 353, an original image whose result is to be displayed is selected by a load button 351. The folder name and the file name of the selected image are displayed in cells 354 and 355. A semantic segmentation result is displayed in a window 356, and an object detection result is displayed in a window 357. In a final result window 358, an image is displayed in which a dimension value is displayed on the original image, and a measured dimension value and a statistical value are displayed in a numerical table 359.

Figure 31:
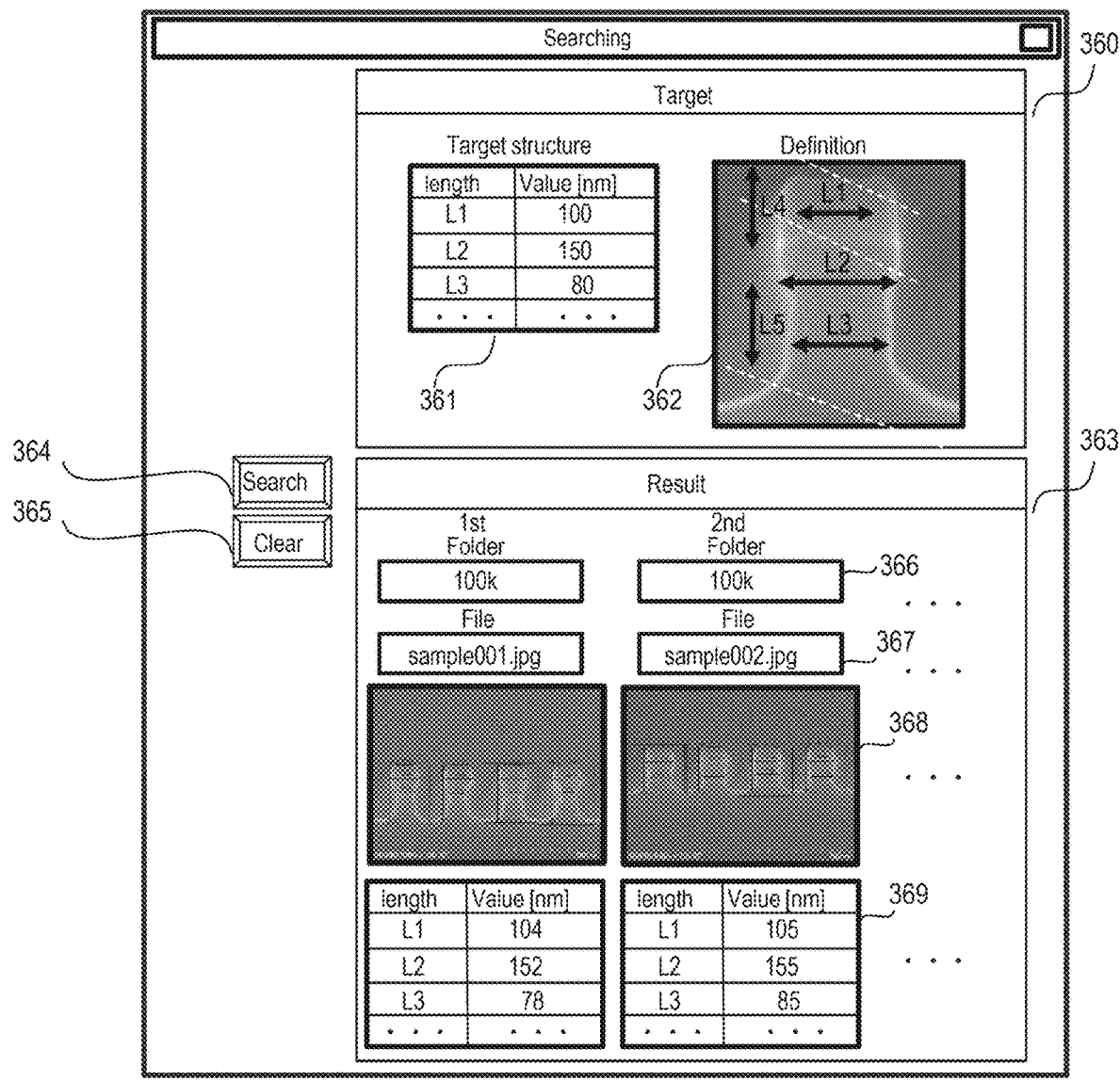
FIG. 31 shows the fifth embodiment of the invention, and is an example of a GUI screen displayed at the time of a goal shape searching step.

FIG. 31 shows an example of a GUI screen displayed on the input and output apparatus 206 when performing a searching step of searching for a shape close to a desired dimension from the database 205, and includes a target window 360 and a searching result window 363. In the target window 360, a goal dimension value is input to a target structure cell 361. Definitions of dimensions L1 to L5 are shown in a definition window 362.

In the searching result window 363, the searching is executed by a search button 364. Searching results are sorted and displayed in ascending order of error, and a folder name 366, a file name 367, an image 368 describing a dimension value, and a dimension average value 369 are displayed.

Sixth Embodiment

In the fifth embodiment, although the semantic segmentation model is used as the first image recognition model and the object detection model is used as the second image recognition model, the dimension measurement method is not limited to the combination. As a sixth embodiment, a method using two types of semantic segmentation models will be described. In the sixth embodiment, a first semantic segmentation model for detecting a contour line and a second semantic segmentation model for detecting a feature point are used. In the sixth embodiment, feature point extraction using an image recognition model will be mainly described, and the description of the same points as those in the first embodiment will be omitted.

Figure 32:
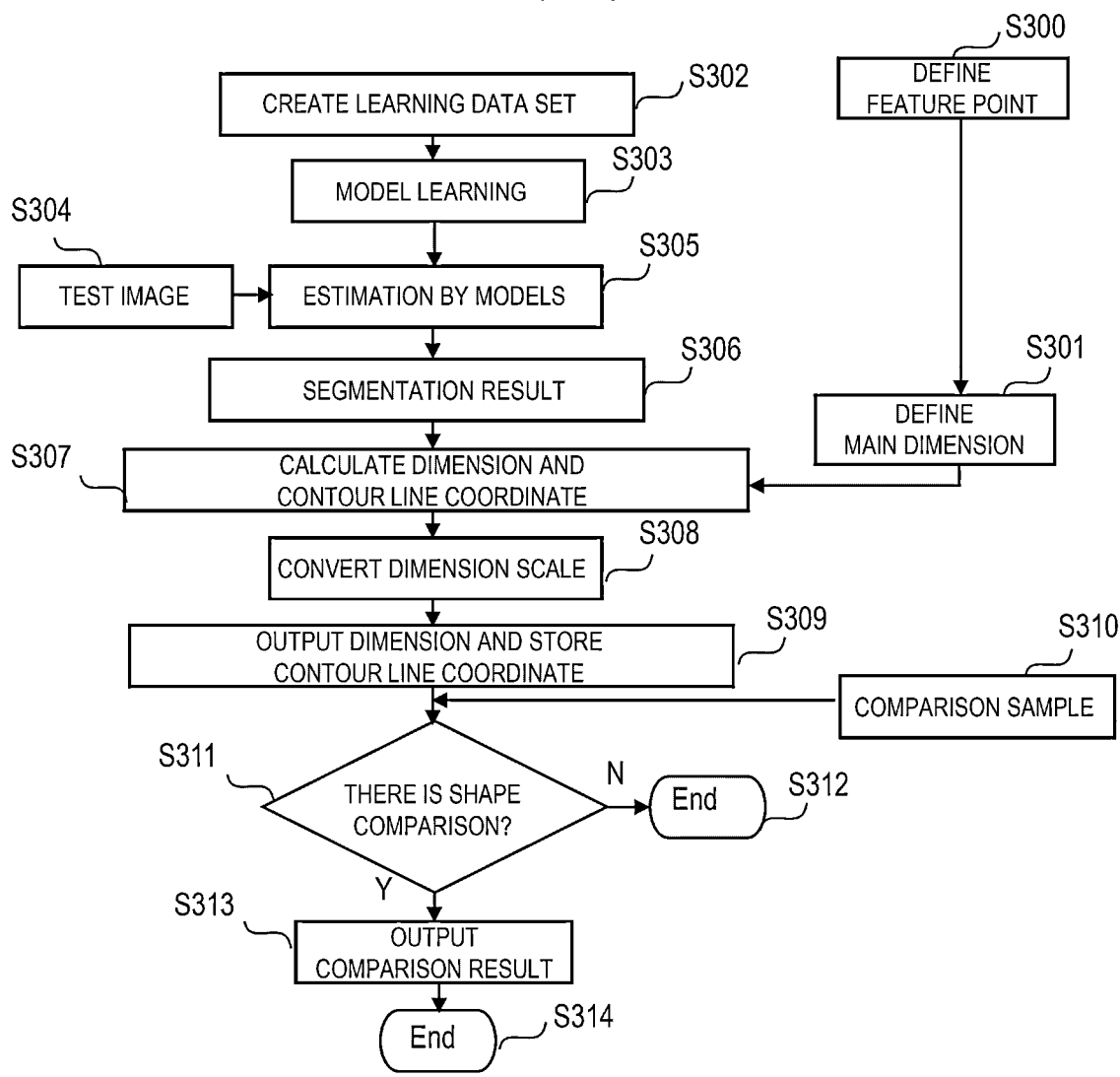
FIG. 32 shows a sixth embodiment of the invention, and is a flowchart in which a dimension measurement apparatus measures a dimension based on an input image.

FIG. 32 is a flowchart of measuring a dimension based on an image input through a preliminary learning step executed by the dimension measurement apparatus 200.

First, the feature point 209 necessary for dimension measurement is defined and stored in the database 205 via the input and output apparatus 206 (step S300). This processing is done before a learning step.

Next, for the first semantic segmentation model (first image recognition model), an annotation image that is divided into a contour line necessary for dimension measurement and other regions is created, and for the second semantic segmentation model (second image recognition model), an annotation image that is divided into feature points necessary for dimension measurement and other regions is created, and the images are input from the input and output apparatus 206 (step S302).

Next, the central processing unit 201 passes the learning data set to the model learning unit 202, and the model learning unit 202 performs learning of the models (step S303). In the following description, a case in which a neural network having a convolutional layer is used as the models will be described, and a machine learning model such as a decision tree may also be used.

Next, a test image whose dimension is to be measured is read from the evaluation apparatus 112 (step S304). The central processing unit 201 passes the image to the model learning unit 202, performs estimation by the model estimation unit 203 (step S305), and obtains two types of semantic segmentation images (step S306).

Next, the correspondence relationship 209 between feature points and dimension measurement points is input from the input and output apparatus 206 and stored in the database 205 (step S301).

Next, the dimension measurement unit 204 obtains feature point coordinates on the contour line based on the two types of semantic segmentation images, calculates a main dimension, and obtains coordinate data of the entire contour line (step S307). Subsequently, the obtained dimension is converted into an actual dimension (step S308). The measured dimension value is output to the input and output apparatus 206, and the coordinate data of the contour line is stored in the database 205 (step S309).

Further, when it is desired to compare processing shapes, two samples to be compared are specified (step S310). Subsequently, it is determined whether or not there is a specification of shape comparison (step S311). If there is no specification, the dimension measurement processing is ended (step S312). If there is a specification, the contour line data and the dimension value stored in the database 205 are read, and the comparison result is output to the input and output apparatus 206 (step S313). Thus, the processing is ended (step S314).

Figures 33, 34:
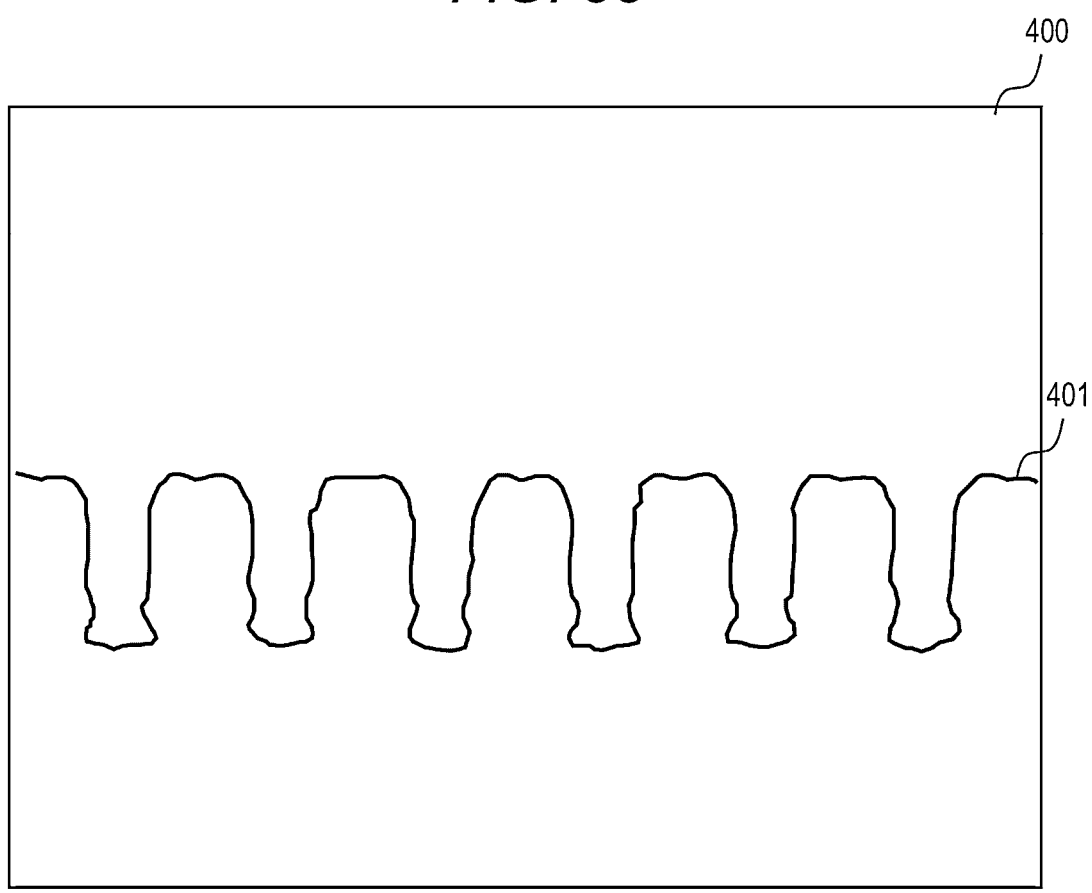
FIG. 33 shows the sixth embodiment of the invention, and is an example of an annotation image used to learn a first semantic segmentation model that detects a contour line.
FIG. 34 shows the sixth embodiment of the invention, and is a table showing a correspondence among a label name, a label number, and a color in the annotation image used for learning of a first semantic segmentation model.

Hereinafter, a case where the processing apparatus 111 is an etching apparatus will be described as an example. FIG. 33 is an example of annotation data that teaches a contour line corresponding to an input data image of the learning data set of FIG. 17. The region includes two regions of a background 400 and a contour line 401. The label names are "background" and "contour", and the label numbers are 0 and 1. FIG. 34 is a correspondence among a label name, a label number, and a color. Although the label number and the color given to each label are arbitrary, it is necessary to fix the label number and the color in the dimension measurement apparatus 200.

Figures 35, 36:
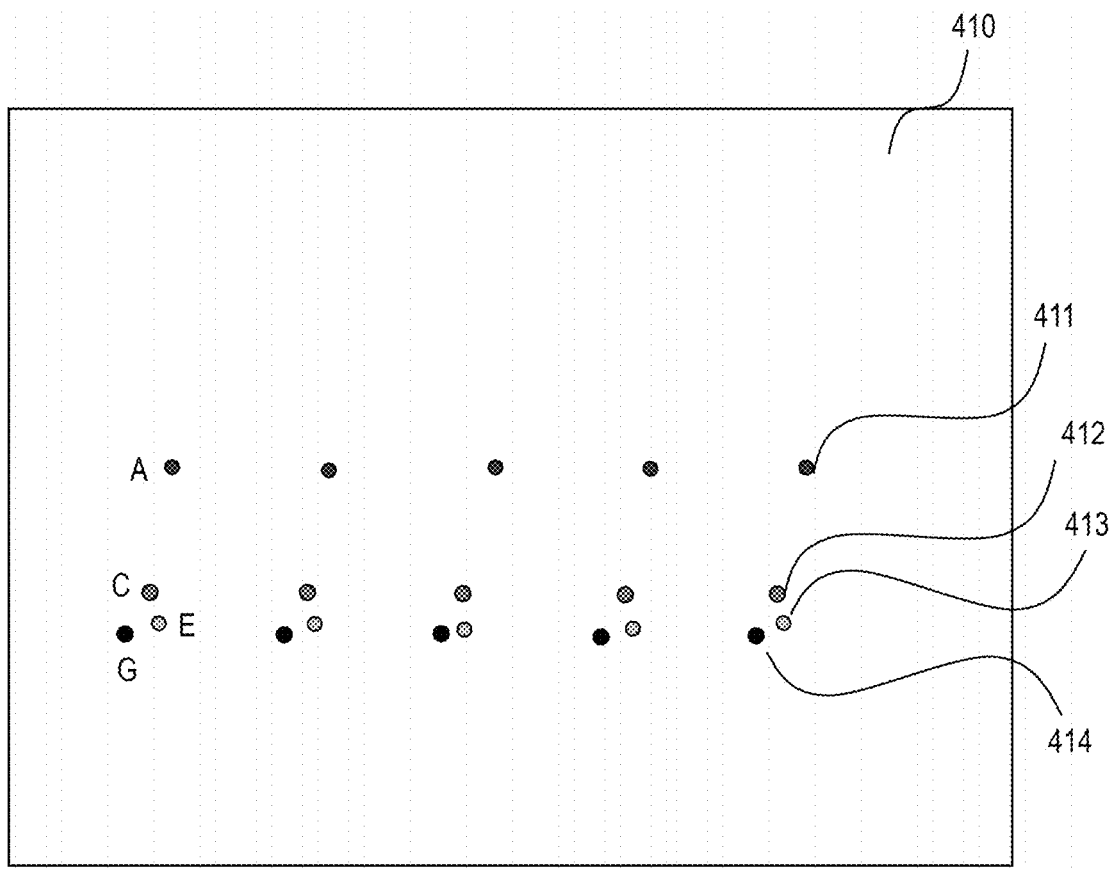
FIG. 35 shows the sixth embodiment of the invention, and is an example of annotation data used for learning a second semantic segmentation model that detects feature points.
FIG. 36 shows the sixth embodiment of the invention, and is a table showing a correspondence among a label name, a label number, and a color in the annotation data used for learning the second semantic segmentation model.

FIG. 35 is an example of annotation data that teaches positions of feature points corresponding to the input data image of the learning data set of FIG. 17. Among the seven points A to G shown in FIG. 18 as the feature points, four points A411, C412, E413, and G414 are set as labels, and FIG. 35 is an image color-coded for each of the five labels including the background 410. Since other three feature points B, D, and F are obtained from A, C, and E assuming symmetry, the three feature points B, D, and F are not included in the label. As described below, by obtaining the feature points A, C, and E based on the feature points B, D, F and the contour line, it is possible to ensure that the feature points B, D, and F and the feature points A, C, and E are feature points for one unit pattern without visual observation. FIG. 36 is a correspondence among a label name, a label number, and a color. Although the label number and the color given to each label are arbitrary, it is necessary to fix the label number and the color in the dimension measurement apparatus 200.

Figure 37:
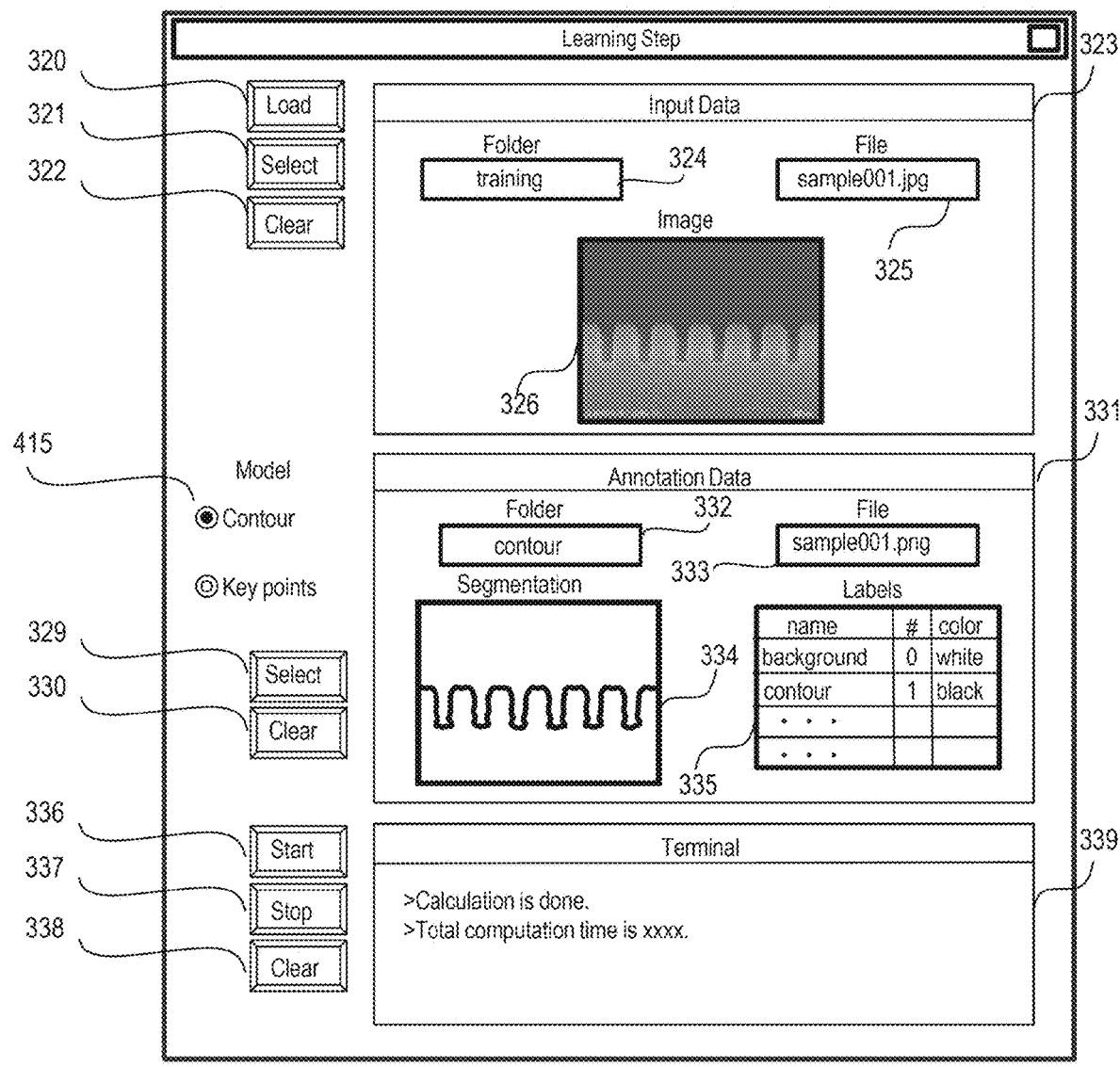
FIG. 37 shows the sixth embodiment of the invention, and is an example of a GUI screen displayed at the time of a learning step.

FIG. 37 shows an example of a GUI screen displayed on the input and output apparatus 206 when performing the learning step. The screen includes the input data window 323, the annotation data window 331, and the terminal window 339. In the input data window 323, a folder in which an input image file is stored is selected by the load button 320. An image file to be displayed is selected by the select button 321. A display result is cleared by the clear button 322. The selected folder name and file name are displayed in the cells 324 and 325. The selected image is displayed in the image window 326.

In the annotation data window 331, any one of the semantic segmentation model for the contour line (first semantic segmentation model) or the semantic segmentation model for feature points (second semantic segmentation model) is selected by a model button 415. The type of data displayed in the annotation data window 331 changes according to the selected model. The folder including the annotation data is also automatically selected according to the model. FIG. 37 shows an example of a case where the semantic segmentation model for the contour line is selected. A sample to be displayed in the window is specified by the select button 329. A folder name and a file name of the selected sample are displayed in the cells 324 and 325. An annotation image is displayed in the window 334, and a correspondence table of a label name, a label number, and a color is displayed in the table 335.

In the terminal window 339, learning of the model selected by the model button 415 is started by the start button 336. In the terminal window 339, a progress of the calculation is displayed and a final result is displayed as messages. The stop button 337 can be used to stop the calculation even in progress. A model parameter, which is a calculation result, is automatically stored.

Figure 38:
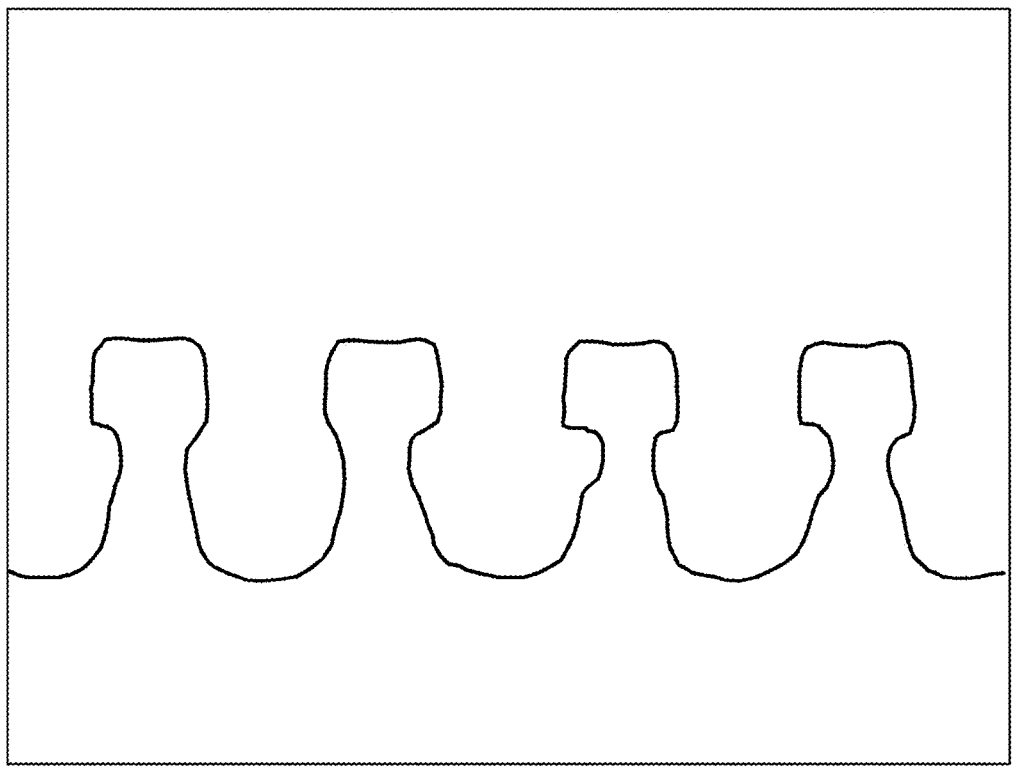
FIG. 38 shows the sixth embodiment of the invention, and is a diagram showing a contour line detection result obtained by inputting a test image into the learned first semantic segmentation model.

FIG. 38 is an image of the detection result of the contour line obtained by inputting the test image shown in FIG. 24 into the first learned semantic segmentation model and performing the prediction. At the same time, the coordinates of the contour line are obtained.

Figure 39:
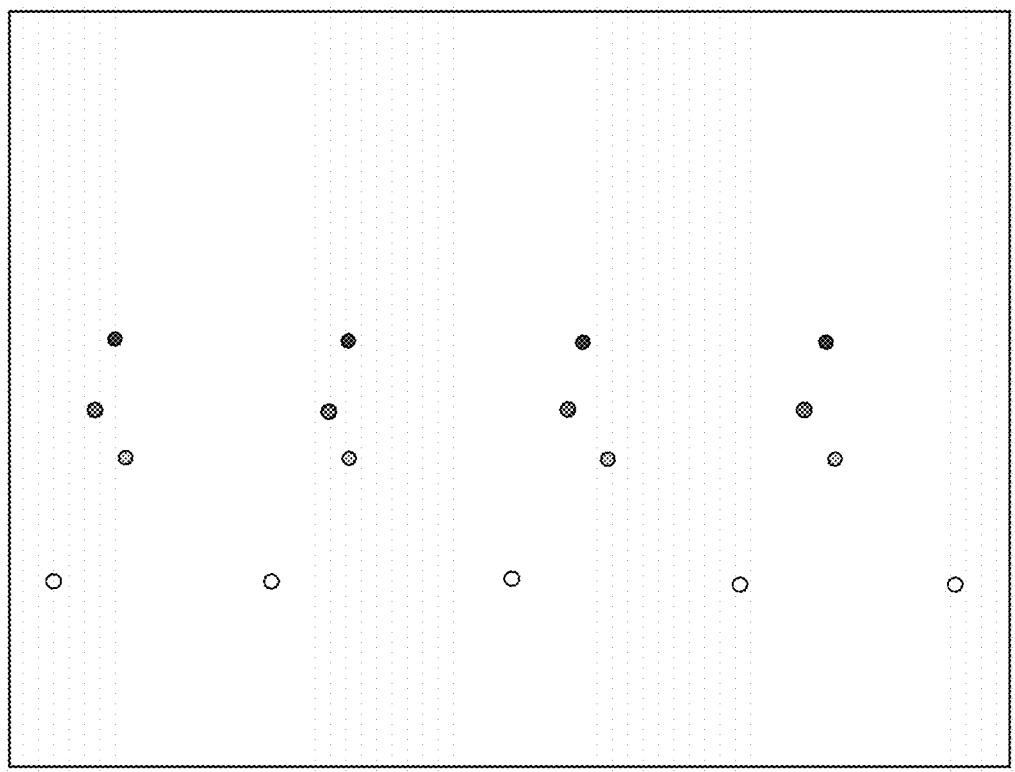
FIG. 39 shows the sixth embodiment of the invention, and is a diagram showing a feature point detection result obtained by inputting a test image into the learned second semantic segmentation model.

FIG. 39 is an image of the detection results of the feature points A, C, E, and G obtained by inputting the test image shown in FIG. 24 into the second learned semantic segmentation model and performing the prediction. At the same time, the coordinates of the feature points are also obtained. Since the coordinates of the feature points are not necessarily located on the contour line obtained in FIG. 38, points on the contour line in FIG. 38 closest to the feature point coordinates obtained in FIG. 39 are adopted as the feature point coordinates.

Figure 40:
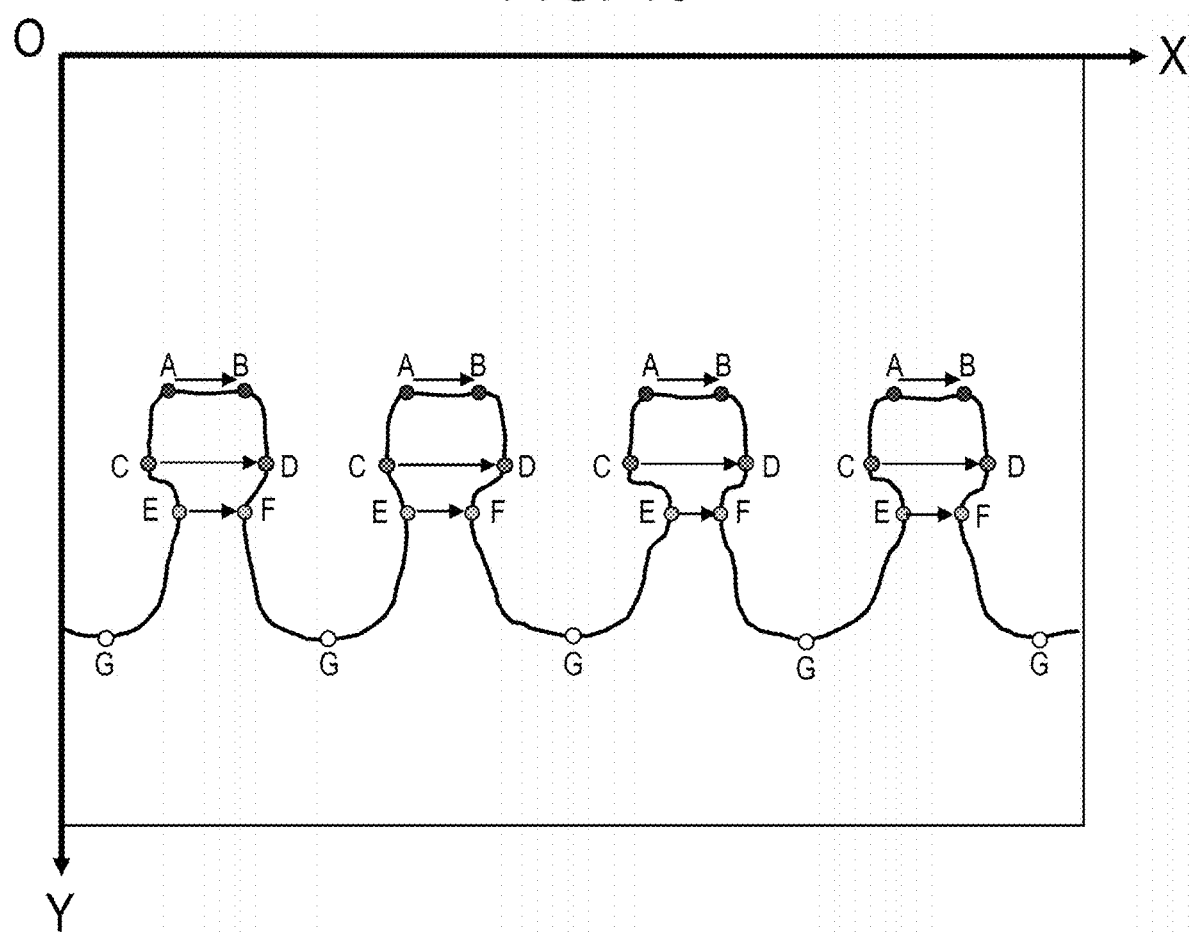
FIG. 40 shows the sixth embodiment of the invention, and is a diagram showing a method of obtaining coordinates of other feature points necessary for dimension measurement based on coordinates of detected feature points.

FIG. 40 is a diagram showing a method of obtaining the corresponding feature points B, D, and F from the feature points A, C, and E. A corresponding point is a point having the same Y coordinate as an original point and a smallest difference in X coordinate, that is, a point on a right nearest contour line. In the fifth embodiment, the boundary line coordinates are divided for each pattern. In the sixth embodiment, since the coordinates of two points serving as a pair are known, the division is not necessary. By definition of the coordinates of the obtained seven feature points and the feature points and dimensions called from the database 205, a predetermined dimension is calculated. In this way, the dimension is automatically measured from the input image.

Figure 41:
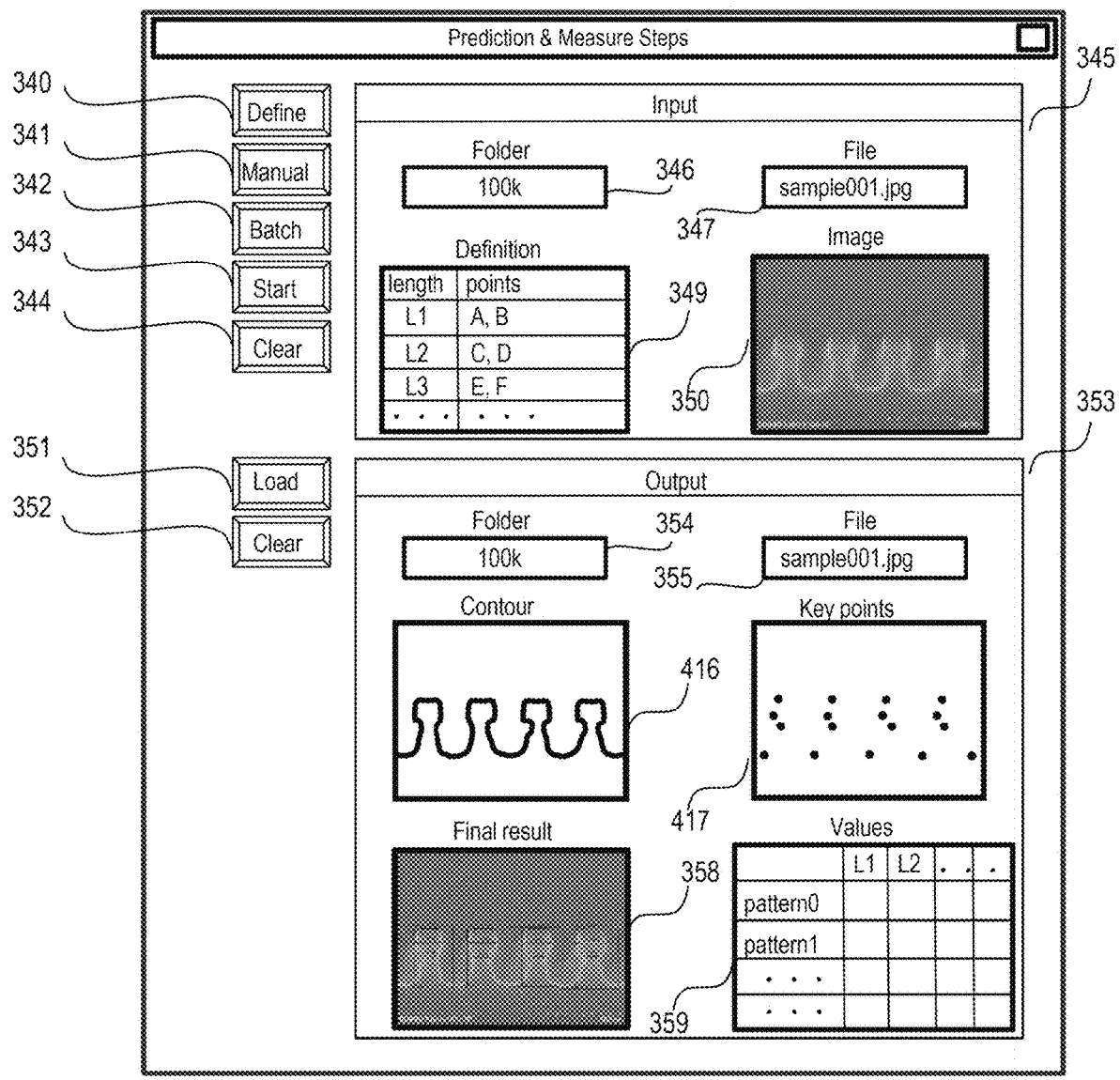
FIG. 41 shows the sixth embodiment of the invention, and is an example of a GUI screen displayed at the time of a prediction and measurement step.

FIG. 41 shows an example of a GUI screen displayed on the input and output apparatus 206 when performing the prediction and measurement steps. The screen includes the input data window 345 and the prediction and measurement result window 353. In the input data window 345, a script defining a correspondence between the feature point and the dimension is selected and read by the define button 340. The read definition is displayed in the definition table 349. Next, it is selected whether to perform prediction and measurement by selecting the test images one by one by the manual button 341 or to specify a folder including the test images and perform prediction and measurement for all images in the folder at once by the batch button 342. By making the folder name match the magnification of the image, information on the magnification can be obtained from the folder name. The selected folder name and file name are displayed in the cells 346 and 347. The selected test image is displayed in the image window 350. When the batch is selected, the file name and the image of a first test image are displayed in the cell 347 and the image window 350. Prediction and dimension measurement are performed using two learned models by the start button 343. A calculation result is automatically stored. A display result is cleared by the clear button 344.

In the prediction and measurement result window 353, an original image whose result is to be displayed is selected by the load button 351. The folder name and the file name of the selected image are displayed in the cells 354 and 355. The semantic segmentation result for the contour line is displayed on a window 416, and the semantic segmentation result for the feature point is displayed on a window 417. In the final result window 358, an image is displayed in which a dimension value is displayed on the original image, and a measured dimension value and a statistical value are displayed in the numerical table 359.

Figure 42:
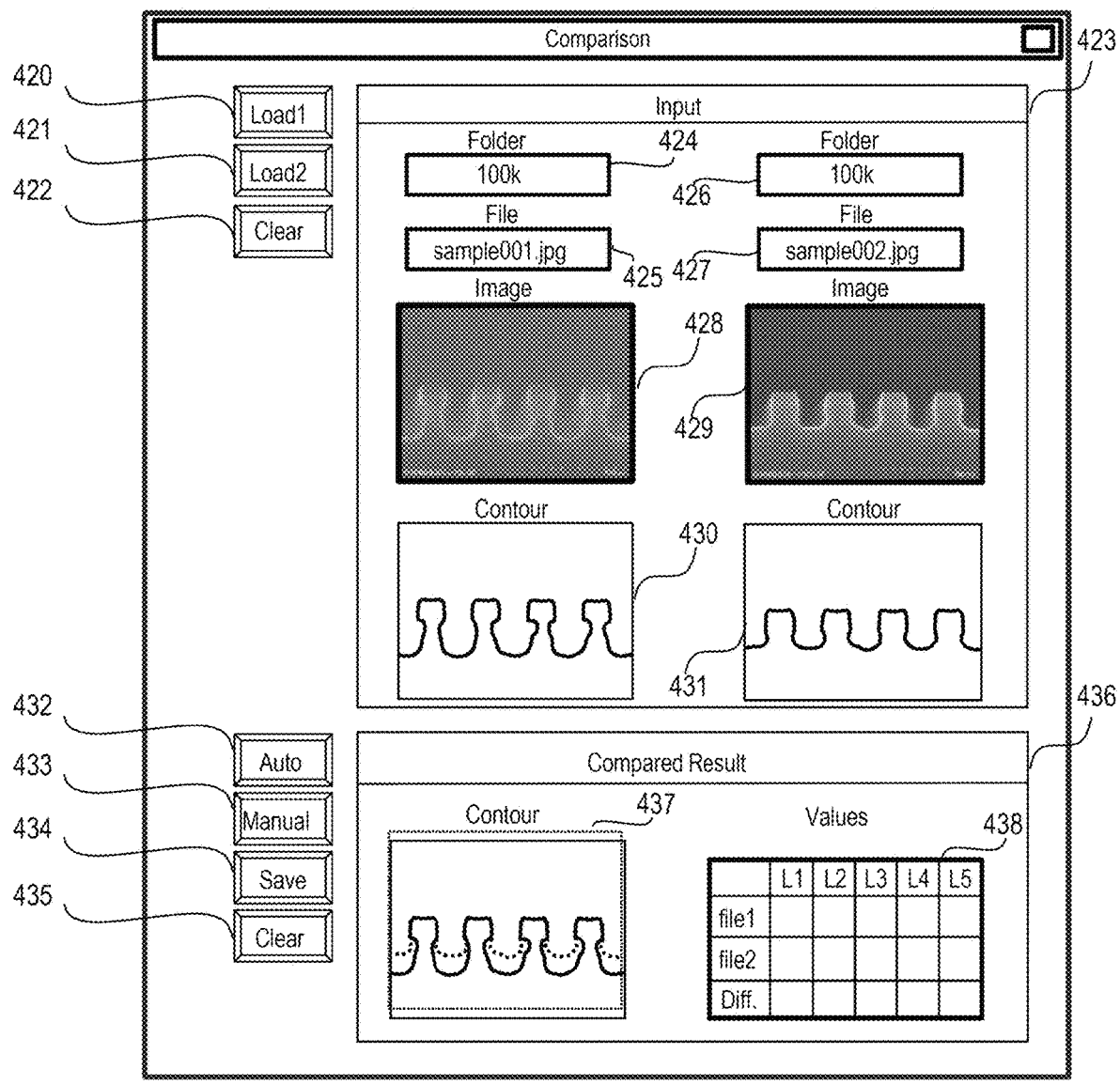
FIG. 42 shows the sixth embodiment of the invention, and is an example of a GUI screen displayed at the time of a shape comparison step.

FIG. 42 shows an example of a GUI screen displayed on the input and output apparatus 206 when a comparison step of comparing shapes of two images is performed. The screen includes an input data window 423 and a comparison result window 436. In the input data window 423, a first image to be compared is selected by a load 1 button 420, and a second image to be compared is selected by a load 2 button 421. The folder name and the file name of the selected first image are displayed in cells 424 and 425, and the folder name and file name of the selected second image are displayed in cells 426 and 427. The two selected images are displayed in image windows 428 and 429. Contour line images extracted for the two selected images are read from the database 205 and displayed in contour line windows 430 and 431.

The comparison result window 436 displays a window 437 in which contour lines are superimposed, and a table 438 showing an average value of the dimension values of the two images and a difference thereof. An auto button 432 is a button for automatically adjusting the two contour lines 430 and 431 so that the mask upper surfaces match in the vertical direction and centers of the trenches match in the horizontal direction. When the automatic adjustment fails or is desired to be manually adjusted, the user presses a manual button 433, and the user drags the image with a mouse to adjust the position. In the table 438, the dimension values measured for the two images are read from the database 205, and the differences therebetween are calculated and displayed. An overwritten contour line image and the numerical value of the table are stored in the database 205 by a save button 434.

The invention is not limited to the above-described embodiments and includes various modifications and equivalent configurations within the spirit of the claims. For example, the above-described embodiments have been described in detail in order to make the invention easy to understand, and the invention is not necessarily limited to those have all the configurations described.

A part of a configuration of a certain embodiment may be replaced with a configuration of another embodiment. A configuration of another embodiment may be added to a configuration of a certain embodiment. Further, another configuration may be added to, subtracted from or replaced with a part of a configuration of each embodiment. For example, in the fifth embodiment, the semantic segmentation model has been described as an example of outputting an image in which each layer constituting the cross section of the semiconductor device is color-coded as a region. However, in the sixth embodiment, the semantic segmentation model that outputs feature points may be used. However, in this case, it is necessary to output all the feature points (feature points A to G in the example of the sixth embodiment) unlike the example of the sixth embodiment.

Seventh Embodiment

A semiconductor manufacturing system on which an image generation apparatus is mounted can be constituted in the same configuration as in the fifth embodiment. Specifically, the dimension measurement apparatus 200 shown in FIGS. 10 and 12 can be replaced with an image generation apparatus. An image generation apparatus 2000 can be constituted to execute processing such as generation of a structure image and generation of a generation image (using a reference image if necessary) from the structure image described in the first to fourth embodiments.

Figure 43:
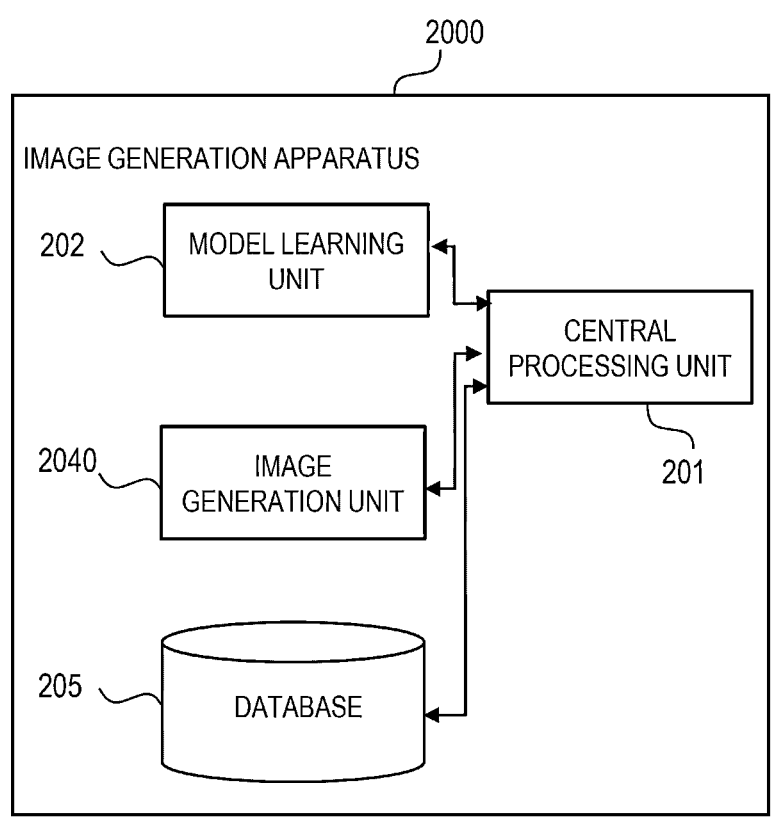
FIG. 43 shows a seventh embodiment of the invention, and is a block diagram showing a configuration example of an image generation apparatus.

FIG. 43 shows a logical configuration example of the image generation apparatus 2000. The image generation apparatus 2000 can be constituted by one computer or a plurality of computers including one or more processors and one or more storage apparatuses, as in the dimension measurement apparatus 200 shown in FIG. 12. When one or more processors operate in accordance with a program, various functions and procedures of the image generation apparatus 2000 can be implemented. In the image generation apparatus 2000, input from the evaluation apparatus 112 is unnecessary.

Similar to the dimension measurement apparatus 200, the image generation apparatus 2000 includes the central processing unit 201, the model learning unit 202, and the database 205. An image generation unit 2040 is provided in place of a portion including both the model estimation unit 203 and the dimension measurement unit 204 of the dimension measurement apparatus 200. The image generation unit 2040 generates an image estimated as an image similar to an actual observation image corresponding to a structure image. A function of the model estimation unit 203 may be separated from a function of the image generation unit 2040.

When using a learning data set as a substitute for the portion including both the model estimation unit 203 and the dimension measurement unit 204 of the dimension measurement apparatus 200, the image generation unit 2040 uses a learning data set having a data set of a structure image and an actual image instead of the learning data set 209.

As described in the first embodiment, when the learned image generation model 1000 is used, the learning of the image generation model 1000 with the model learning unit 202 is not necessary. The image generation model 1000 can be operated by storing the learned model data or executable file in the database 205 or an external data storage region and loading the learned model data or the executable file.

In addition, when there is the learning data set for the image generation model 1000, a user can store the learning data set in the database 205 in advance, and the model learning unit 202 can construct the learned image generation model 1000 by using the learning data set.

A reference image is stored in the database 205 or the external data storage region and is used during image generation by the image generation model 1000.

The image generation apparatus 2000 receives a structure image or a structure image and a reference image input via, for example, the input and output apparatus 206, inputs these images to the image generation model 1000 and outputs a generation image, stores the generation image in the database 205, and outputs the generation image to the input and output apparatus 206.

The input and output apparatus 206 includes an input and output interface such as a GUI and a storage medium reading device such as a card reader, and inputs a learning data set to the image generation apparatus 2000.

The input and output apparatus 206 includes, for example, a keyboard, a mouse, a display, a touch panel, the storage medium reading device. The generation image passed from the image generation apparatus 2000 is displayed to the user. When displaying the image to the user, the input and output apparatus 206 executes, for example, displaying on a display or writing to a file.

The image generation apparatus 2000 acquires the structure image or the structure image and the reference image via, for example, the input and output apparatus 206, generates the generation image based on the images, and outputs the generation image to the input and output apparatus 206.

The image generation apparatus 2000 includes the processor 116, the communication interface 115, the ROM 117, and the RAM 118. The communication interface 115 connects the processor 116 and the external input and output apparatus 206. The processor 116 connects the communication interface 115, the ROM 117, and the RAM 118. A processing program executed by the processor 116 is stored in the ROM 117. Learning data, a learning model, a structure image, a reference image, and the like are stored in the RAM 118.

The database 205 is stored in the ROM 117 and the RAM 118, and the model learning unit 202 and the image generation unit 2040 can be implemented by the processor 116 that operates according to programs and parameters stored in the ROM 117 and the RAM 118.

The image generation model configuration used in the image generation apparatus 2000 is the same as the configuration described with reference to FIG. 13, for example. In the image generation model, each pixel of structure image data is an input, and each pixel of generation image data is an output. Although FIG. 13 shows an example in which the neural network 20 is used, the invention is not limited to this, and a machine learning model such as a decision tree can also be used.

The semiconductor manufacturing system 10 can include the dimension measurement apparatus 200 and the image generation apparatus 2000. After the structure image and the data set of the generation image are stored in the database by the image generation apparatus 2000, the learning model of the dimension measurement apparatus 200 can be constructed and the dimension measurement can be performed using the data as learning data. A part or all functions of the image generation apparatus 2000, the dimension measurement apparatus 200, and the processing condition searching apparatus 100 may be included in another apparatus.

Figure 44:
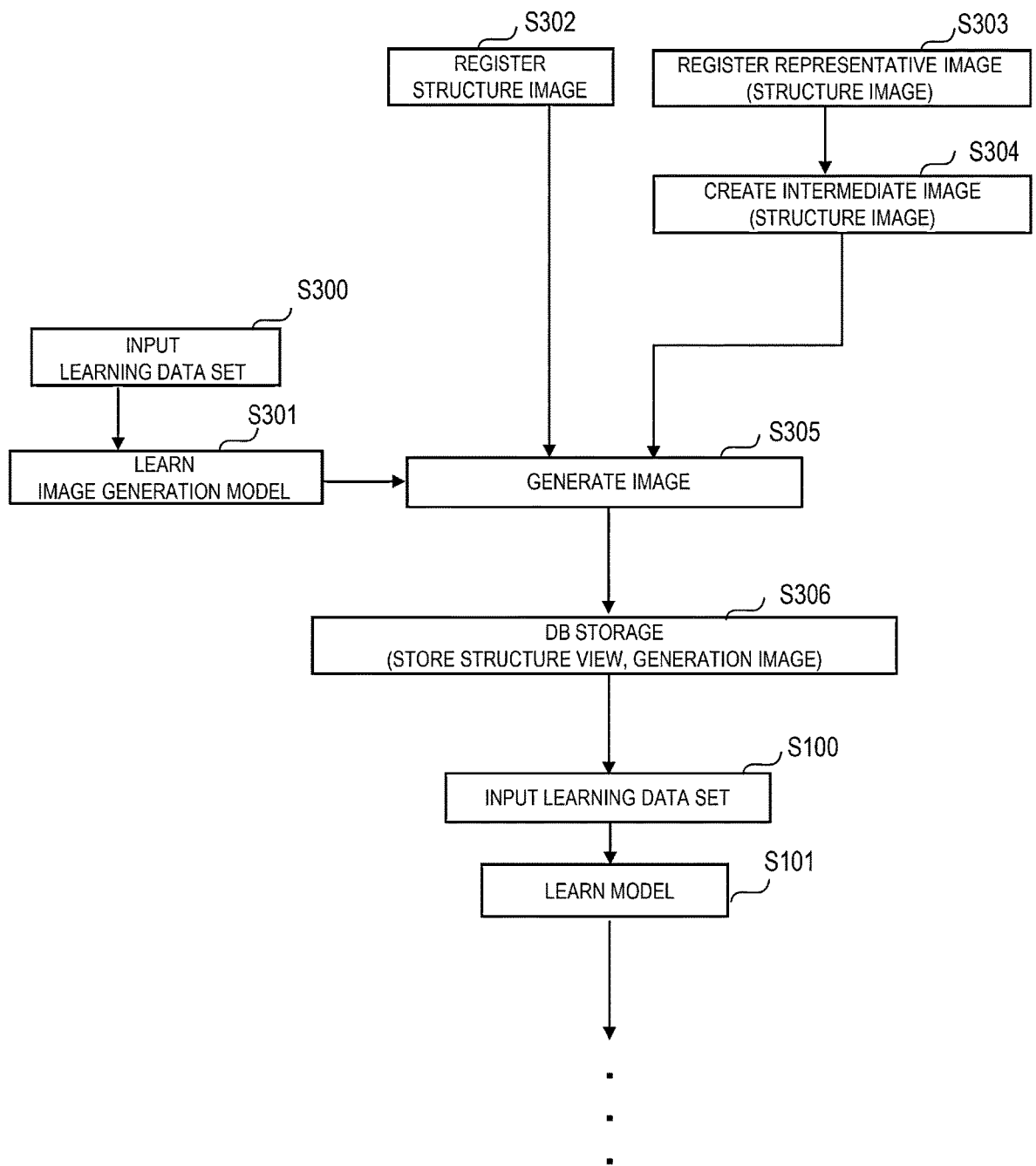
FIG. 44 shows the seventh embodiment of the invention, and is a flowchart of outputting a generation image by using a structure image to be executed by the image generation apparatus as input.

FIG. 44 is a flowchart of outputting a generation image by using a structure image to be executed by the image generation apparatus 2000 as input.

When learning an image generation model, the user creates a learning data set to be input to the image generation apparatus 2000 in advance. The learning data set includes, for example, a set of input and output of a generation image generated such that the input data is a structure image and the output data is an image similar to an actual observation image. The user inputs the learning data set from the input and output apparatus 206 (step S300). The input learning data set is stored in the database 205.

Next, the central processing unit 201 transfers the learning data set and an image generation model from the database 205 to the model learning unit 202, and performs learning of the image generation model by the model learning unit 202 (step S301). Parameters of the learned image generation model are stored in the database 205. When the previously learned image generation model is used, steps S300 and S301 are skipped.

The user inputs the structure image from the input and output apparatus 206 (step S302). As described with reference to FIG. 2, general drawing software such as draw software and paint software can be used to create the structure image. The structure image can also be created using CAD software.

As a method of inputting the structure image, as described in FIGS. 4 to 7, it is possible to use a method of registering two representative structure images (step S303) and creating a plurality of structure images therebetween (step S304). The user inputs two representative images from the input and output apparatus 206 and inputs information for morphing. The image generation unit 2040 generates an intermediate image by morphing in accordance with the two representative images and user specification information.

In the image generation from the structure image (step S305), the image generation unit 2040 uses the image generation model learned in step 301 or the image generation model learned in advance as the image generation model. As the structure image, the registered image in step 302 or the registered image in step 303 and the intermediate image created in step 304 are used. Alternatively, all of these structure images may be used as the structure image. The image generation unit 2040 stores the structure image and the generation image in a database (step S306). The structure image may be stored in the database when the structure image is registered.

The data stored in step S306 is used as the learning data set described with reference to FIG. 15 (step S100).

Specifically, as shown with reference to FIG. 3A, by inputting the actual image into the structure acquisition model, the structure image is output, and these actual image and the structure image are registered in the database. Next, dimension data is output by inputting the structure image into the dimension extraction model. The learning method of the structure acquisition model and the dimension acquisition model is as described with reference to the flowchart of FIG. 15.

Figure 45:
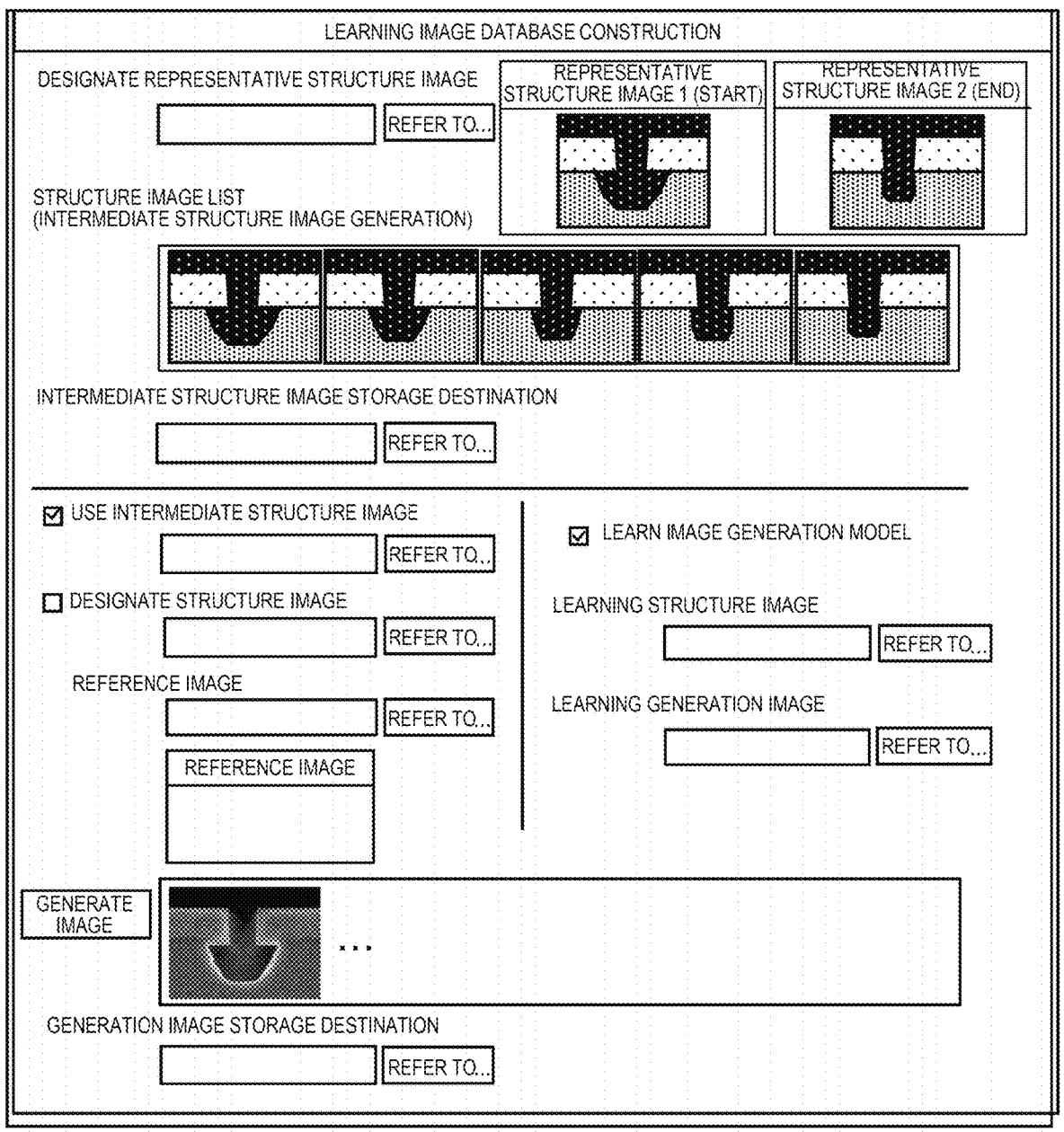
FIG. 45 shows the seventh embodiment of the invention, and is an example of a GUI screen when the structure image is input and the generation image is output in the image generation apparatus.

FIG. 45 shows an example of a GUI screen when the image generation apparatus 2000 creates a structure image and outputs a generation image by inputting the structure image. In this GUI, the user first specifies two representative structure images. The specified representative structure images are displayed on the GUI. In addition, the representative structure images and an intermediate image created using the representative structure images are displayed. These structure images are stored in an intermediate image storage destination.

When generating the generation image based on the structure images, the user can select whether to use the stored intermediate structure image and representative structure images or to use a separately created structure image in the GUI. Further, by referring to a reference image, the user can select a method of generating the generation image or a method of using an image generation model learned using a learning structure image and a learning generation image.

When the reference image is used, the user specifies a reference image to be used. At this time, the specified reference image is displayed on the GUI. When the image generation model is to be learned, the user specifies the learning structure image and the learning generation image to be used for learning.

After the above procedure, image generation is performed by pressing an image generation button, and a generation image is displayed on the GUI. In addition, the user can specify a storage destination of the generation image.

As described above, by measuring the feature dimension of the structure image acquired from the actual image using the dimension extraction model that can acquire the predetermined feature dimension, databases of apparatus conditions when the actual image is acquired, the actual image, the structure image acquired from the actual image, and the feature dimension can be automatically constructed. In addition, the learning model that outputs the structure image corresponding to the apparatus condition can be constructed using these databases and the apparatus condition that implements the goal shape can be estimated using the learning model.

Parts or all of the configurations, functions, processing units, processing methods described above and the like may be implemented by hardware, for example by designing with an integrated circuit, or may be implemented by software, with a processor to interpret and execute a program that implements each function. Information such as a program, a table, and a file that implements each function can be stored in a storage apparatus such as a memory, a hard disk, and a solid state drive (SSD), or a non-transitory recording medium such as an integrated circuit (IC) card, an SD card, and a digital versatile disc (DVD).

Control lines and information lines indicate what is considered necessary for explanation, and not all control lines and information lines in the products are shown. In practice, it may be considered that almost all the configurations are connected with each other.

Representative examples of aspects of the disclosure are described below in addition to the configurations set forth in the claims.

One aspect of the disclosure provides a dimension measurement apparatus that measures a dimension of a semiconductor device having a repetitive pattern from a cross-sectional image of the semiconductor device. The dimension measurement apparatus includes: a processor; a memory; and a dimension measurement program that is stored in the memory and measures a dimension of the semiconductor device by being executed by the processor. The dimension measurement program includes a model estimation unit and a dimension measurement unit. The model estimation unit outputs, by a first image recognition model, a labeled image in which the cross-sectional image is labeled for each region, and outputs, by a second image recognition model, coordinates where unit patterns constituting the repetitive pattern are respectively located in the cross-sectional image. The dimension measurement unit obtains coordinates of a plurality of feature points defined in advance for each of the unit patterns using the labeled image and the coordinates where the unit patterns are located, and measures a dimension defined as a distance between two predetermined points among the plurality of feature points.

Further, another aspect of the disclosure provides a dimension measurement apparatus that measures a dimension of a semiconductor device having a repetitive pattern from a cross-sectional image of the semiconductor device. The dimension measurement apparatus includes: a processor; a memory; and a dimension measurement program that is stored in the memory and measures a dimension of the semiconductor device by being executed by the processor. The dimension measurement program includes a model estimation unit and a dimension measurement unit. The model estimation unit outputs, by a first image recognition model, a first labeled image in which the cross-sectional image is labeled in a contour line and a background, and outputs, by a second image recognition model, a second labeled image in which the cross-sectional image is labeled in a background and a first plurality of feature points defined in a unit pattern constituting the repetitive pattern. The dimension measurement unit uses coordinates of the contour line from the first labeled image and coordinates of the first plurality of feature points from the second labeled image to obtain a second plurality of feature points, and measures a dimension defined as a distance between a predetermined point of the first plurality of feature points and a predetermined point of the second plurality of feature points.

What is claimed is:

1. A system that generates an image in which a structure image is similar to an actual image by image processing of the structure image, the system comprising:
one or more storage apparatuses; and
one or more processors that operate in accordance with a program stored in the one or more storage apparatuses, wherein
the one or more processors
acquire a first structure image and a second structure image different from the first structure image,
create a plurality of intermediate structure images indicating an intermediate structure between the first structure image and the second structure image, and
generate an image by making each of the plurality of intermediate structure images to be similar to an actual image by the image processing of each of the plurality of intermediate structure images.

2. The system according to claim 1, wherein
the one or more processors generate an image in which each of the plurality of intermediate structure images is similar to the actual image based on a reference image.

3. The system according to claim 1, wherein
one of the first structure image and the second structure image is a structure image corresponding to a goal shape.

4. The system according to claim 1, wherein
one of the first structure image and the second structure image is a structure image corresponding to a shape closest to a goal shape in an acquired actual image.

5. The system according to claim 1, wherein
the first structure image is a structure image corresponding to a shape closest to a goal shape in an acquired actual image, and
the second structure image is a structure image corresponding to the goal shape.

6. The system according to claim 1, wherein
the one or more processors generate the plurality of intermediate structure images by changing a structure image from the first structure image to the second structure image according to a specified correspondence.

7. The system according to claim 1, wherein
the one or more processors
construct a database including the plurality of intermediate structure images and an image in which each of the plurality of intermediate structure images is similar to the actual image,
construct a structure acquisition model that outputs a structure image from an input actual image by using the database, and
generate a new structure image from a new actual image using the structure acquisition model.

8. The system according to claim 7, wherein
the one or more processors measure a predetermined feature dimension in the new structure image using a dimension extraction model that extracts the feature dimension.

9. The system according to claim 8, wherein
the one or more processors
construct a learning model that outputs a structure image corresponding to an input apparatus condition using a database including the measured feature dimension, the new structure image, the new actual image, and an apparatus condition for processing a sample from which the new actual image is acquired, and
estimate an apparatus condition for implementing a goal shape using the learning model.

10. The system according to claim 2, wherein
one of the first structure image and the second structure image is a structure image corresponding to a goal shape.

11. The system according to claim 2, wherein
one of the first structure image and the second structure image is a structure image corresponding to a shape closest to a goal shape in an acquired actual image.

12. The system according to claim 2, wherein
the first structure image is a structure image corresponding to a shape closest to a goal shape in an acquired actual image, and
the second structure image is a structure image corresponding to the goal shape.

13. The system according to claim 2, wherein
the one or more processors generate the plurality of intermediate structure images by changing a structure image from the first structure image to the second structure image according to a specified correspondence.

14. The system according to claim 2, wherein
the one or more processors
construct a database including the plurality of intermediate structure images and an image in which each of the plurality of intermediate structure images is similar to the actual image, construct a structure acquisition model that outputs a structure image from an input actual image by using the database, and generate a new structure image from a new actual image using the structure acquisition model.

15. The system according to claim 14, wherein the one or more processors measure a predetermined feature dimension in the new structure image using a dimension extraction model that extracts the feature dimension.

16. The system according to claim 15, wherein the one or more processors construct a learning model that outputs a structure image corresponding to an input apparatus condition using a database including the measured feature dimension, the new structure image, the new actual image, and an apparatus condition for processing a sample from which the new actual image is acquired, and estimate an apparatus condition for implementing a goal shape using the learning model.

17. A method for a system to generate an image in which a structure image is similar to an actual image by image processing of the structure image, the method comprising:

acquiring, by the system, a first structure image and a second structure image different from the first structure image, creating, by the system, a plurality of intermediate structure images indicating an intermediate structure between the first structure image and the second structure image, and generating, by the system, an image by making each of the plurality of intermediate structure images to be similar to an actual image by image processing of each of the plurality of intermediate structure images.

* * * * *